US012384444B2

United States Patent
Koitabashi et al.

(10) Patent No.: US 12,384,444 B2
(45) Date of Patent: Aug. 12, 2025

(54) STEERING COLUMN DEVICE

(71) Applicant: NSK Steering & Control, Inc., Tokyo (JP)

(72) Inventors: Hiroto Koitabashi, Maebashi (JP); Yuta Manaka, Maebashi (JP); Hiroshi Kakita, Maebashi (JP); Rei Mitsui, Maebashi (JP); Nobuhiro Koujiya, Maebashi (JP)

(73) Assignee: NSK STEERING & CONTROL, INC., Tokyo (JP)

( * ) Notice: Subject to any disclaimer, the term of this patent is extended or adjusted under 35 U.S.C. 154(b) by 0 days.

(21) Appl. No.: 18/689,489

(22) PCT Filed: Sep. 5, 2022

(86) PCT No.: PCT/JP2022/033301
§ 371 (c)(1),
(2) Date: Sep. 30, 2024

(87) PCT Pub. No.: WO2023/038013
PCT Pub. Date: Mar. 16, 2023

(65) Prior Publication Data
US 2025/0018995 A1 Jan. 16, 2025

(30) Foreign Application Priority Data
Sep. 9, 2021 (JP) .................................. 2021-146989

(51) Int. Cl.
*B62D 1/184* (2006.01)
*B62D 1/185* (2006.01)

(52) U.S. Cl.
CPC ............. *B62D 1/184* (2013.01); *B62D 1/185* (2013.01)

(58) Field of Classification Search
CPC ........... B62D 1/18; B62D 1/185; B62D 1/184
See application file for complete search history.

(56) References Cited

U.S. PATENT DOCUMENTS 8,991,861 B1 * 3/2015 Iwakawa ................ B62D 1/181
74/495
9,126,624 B2 * 9/2015 Iwakawa ................ B62D 1/181
(Continued)

FOREIGN PATENT DOCUMENTS

EP   3 075 629 B1   11/2017
JP   2007-083936 A   4/2007
(Continued)

OTHER PUBLICATIONS

International Search Report for PCT/JP2022/033301 dated Nov. 15, 2022.

*Primary Examiner* — Paul N Dickson
*Assistant Examiner* — Maxwell L Meshaka
(74) *Attorney, Agent, or Firm* — Sughrue Mion, PLLC

(57) ABSTRACT

[Problem] To enable an adjustment lever to be operated to a normal position in a case where the adjustment lever is operated in order to hold a steering wheel at an adjusted position, even when positions in the axial direction of a protruding engagement portion and a recessed engagement portion are shifted, and to prevent a locking mechanism from being damaged.
[Solution] An outer side locking member 40 includes: a first element 51 at least a portion of which is supported so as to be movable toward and away from an inner side locking member 39; a second element 52 that has a protruding engagement portion 65 and is supported such that the protruding engagement portion 65 is able to displace in an engagement-disengagement direction with respect to a recessed engagement portion 41 provided in the inner side locking member 39; a first biasing member 53 that elastically biases at least a portion of the first element 51 in a direction away from the inner side locking member 39; and a second biasing member 54 that elastically biases the second element 52 in a direction with respect to the engage-
(Continued)

ment-disengagement direction such that the protruding engagement portion 65 is engaged with the recessed engagement portion 41.

10 Claims, 22 Drawing Sheets

(56) References Cited

U.S. PATENT DOCUMENTS

| | | | |
|---|---|---|---|
| 9,254,861 B2* | 2/2016 | Iwakawa | B62D 1/187 |
| 9,409,590 B2* | 8/2016 | Johta | B62D 1/184 |
| 9,434,403 B2* | 9/2016 | Johta | B62D 1/184 |
| 9,637,161 B2* | 5/2017 | Orihara | B62D 1/19 |
| 9,669,781 B2* | 6/2017 | Kakita | B60R 16/027 |
| 9,688,222 B2* | 6/2017 | Kakita | B60R 16/0231 |
| 9,707,910 B2* | 7/2017 | Kakita | B62D 1/187 |
| 9,834,245 B2* | 12/2017 | Orihara | B62D 1/19 |
| 10,035,479 B2* | 7/2018 | Orihara | B62D 1/192 |
| 10,160,475 B2 | 12/2018 | Uesaka | |
| 10,919,559 B2 | 2/2021 | Shiroishi | |
| 11,440,579 B2* | 9/2022 | Kakita | B62D 1/185 |
| 11,919,564 B2* | 3/2024 | Fevre | B62D 1/185 |
| 12,128,947 B1* | 10/2024 | Patki | B62D 1/187 |
| 2015/0069745 A1* | 3/2015 | Iwakawa | B62D 1/185 280/775 |
| 2015/0075316 A1* | 3/2015 | Iwakawa | B62D 1/189 74/493 |
| 2015/0090067 A1* | 4/2015 | Iwakawa | B62D 1/181 74/493 |
| 2015/0239490 A1* | 8/2015 | Sakata | B62D 1/189 74/493 |
| 2015/0344062 A1* | 12/2015 | Johta | B62D 1/195 74/493 |
| 2016/0016604 A1* | 1/2016 | Johta | B62D 1/195 74/493 |
| 2016/0280159 A1* | 9/2016 | Kakita | B60R 16/03 |
| 2016/0355208 A1* | 12/2016 | Orihara | B62D 1/185 |
| 2017/0057433 A1* | 3/2017 | Kakita | B60R 16/0231 |
| 2017/0072877 A1* | 3/2017 | Kakita | B62D 1/192 |
| 2017/0297607 A1* | 10/2017 | Orihara | B62D 1/192 |
| 2018/0001845 A1* | 1/2018 | Orihara | B62D 1/187 |
| 2018/0037250 A1 | 2/2018 | Kreutz et al. | |
| 2022/0001914 A1* | 1/2022 | Kakita | B62D 1/185 |
| 2022/0410962 A1* | 12/2022 | Fevre | B62D 1/185 |
| 2024/0343292 A1* | 10/2024 | Park | B62D 1/185 |
| 2025/0018995 A1* | 1/2025 | Koitabashi | B62D 1/184 |

FOREIGN PATENT DOCUMENTS

| | | | | |
|---|---|---|---|---|
| JP | 2016-190522 A | | 11/2016 | |
| JP | 2017-171196 A | | 9/2017 | |
| JP | 2017-197007 A | | 11/2017 | |
| JP | 2018-002056 A | | 1/2018 | |
| JP | 2019-031290 A | | 2/2019 | |
| JP | 2019034630 A | * | 3/2019 | |
| JP | 2019034631 A | * | 3/2019 | |
| JP | 2019-093737 A | | 6/2019 | |
| JP | 2019116271 A | * | 7/2019 | |
| JP | 2019116272 A | * | 7/2019 | |
| JP | 2019142500 A | * | 8/2019 | B60R 16/027 |

* cited by examiner

FIG. 12

STEERING COLUMN DEVICE

CROSS REFERENCE TO RELATED APPLICATIONS

This application is a National Stage of International Application No. PCT/JP2022/033301 filed Sep. 5, 2022, claiming priority based on Japanese Patent Application No. 2021-146989 filed Sep. 9, 2021.

TECHNICAL FIELD

The present disclosure relates to a steering column device for rotatably supporting a steering shaft that supports a steering wheel.

BACKGROUND ART

FIG. 22 illustrates an example of a steering device for an automobile. A rotation of a steering wheel 100 is transmitted to an input shaft 102 of a steering gear unit 101, and as an input shaft 102 rotates, a pair of left and right tie rods 103 are pushed and pulled, giving a steering angle to front wheels. The steering wheel 100 is supported and fixed to a rear end portion of a steering shaft 104, and the steering shaft 104 is inserted in an axial direction through an inside of a steering column 105 and is rotatably supported by the steering column 105. A front end portion of the steering shaft 104 is connected to a rear end portion of an intermediate shaft 107 through a universal joint 106, and a front end portion of the intermediate shaft 107 is connected to the input shaft 102 through another universal joint 108.

Some steering devices for automobiles include a tilt mechanism for adjusting an up-down position of the steering wheel 100 and a telescopic mechanism for adjusting a front-rear position according to a physique and a driving posture of a driver. To configure the tilt mechanism, the steering column 105 is supported with respect to a vehicle body 110 so as to pivotally displace around a pivot shaft 109 arranged in a width direction. Furthermore, an intermediate portion in the axial direction of the steering column 105 is supported by a fixed bracket 111 supported by the vehicle body 110 so as to displace in an up-down direction.

In addition, in order to configure the telescopic mechanism, the steering column 105 is configured by combining an outer column 112 and an inner column 113 in a telescopic manner so as to allow relative displacement in the axial direction. Moreover, the steering shaft 104 is configured by combining an outer tube 114 and an inner shaft 115 through a spline engagement or the like to allow torque transmission and to allow relative displacement in the axial direction. Furthermore, the intermediate portion in the axial direction of the steering column 105 (outer column 112) is supported by the fixed bracket 111 supported by the vehicle body 110 so as to displace in a front-rear direction.

In a steering device that includes a tilt mechanism and/or a telescopic mechanism, except for an electric type, the position of the steering wheel 100, based on an operation of an adjustment lever, can be adjusted between a state in which the position can be adjusted and a state in which the steering wheel 100 is held at the adjusted position.

In JP 2007-083936 A, a steering device is described that, based on the operation of an adjustment lever, switches between a state in which the front-rear position of a steering wheel can be adjusted and a state in which the steering wheel is held at the adjusted position. In this steering device, by switching an engagement state between a tooth portion of a tooth member and a tooth portion of an inner column based on the operation of the adjustment lever, it is possible to switch between a state in which the front-rear position of the steering wheel can be adjusted and a state in which the steering wheel is held at the adjusted position.

In JP 2016-190522 A, a locking means is described that, by switching an engagement state between an engaging protrusion of a locking member that is pivotally supported on an outer column and a locking hole in a locking plate that is supported on an inner column based on an operation of an adjustment lever, switches between a state in which a front-rear position of a steering wheel can be adjusted and a state in which the steering wheel is held at the adjusted position.

The locking means includes a biasing spring that elastically biases the locking member in a direction such that the engaging protrusion engages with the locking hole. Therefore, in a case where the adjustment lever is operated to hold the steering wheel in the adjusted position, even in a case where a semi-locked state occurs in which the engaging protrusion and a portion of the locking plate that is deviated from the locking hole come into contact with each other, when the adjustment lever is further operated from the semi-locked state, the biasing spring will be elastically deformed, allowing rotation of the adjustment lever. Therefore, the adjustment lever can be reliably returned to the normal position while the steering wheel is held in the adjusted position, and damage to the locking member and the locking plate can be prevented.

CITATION LIST

Patent Literature

Patent Literature 1: JP 2007-083936 A
Patent Literature 2: JP 2016-190522 A

SUMMARY OF INVENTION

Technical Problem

The steering device described in JP 2007-083936 A may have the following problems. That is, in a case where the adjustment lever is operated in order to hold the steering wheel at the adjusted position, a semi-locked state may occur in which a tip-end surface of a protruding portion of the tooth portion of the tooth member comes into contact with a tip-end surface of a protruding portion of the tooth portion of the inner column. When trying to operate the adjustment lever further from this semi-locked state, there is a possibility that the adjustment lever will not be able to be operated any further in the operating direction required to move the steering wheel to a state where the steering wheel can be held at the adjusted position (the force required for operation becomes excessive), or damage such as deformation may occur in the tooth portion of the tooth member and/or the tooth portion of the inner column.

The structure described in JP 2016-190522 A avoids the above problem in the semi-locked state; however, in a case where a large axial force is applied to the inner column in a state in which the engaging protrusion and the locking hole are engaged with each other causing the engaging protrusion and the locking hole to become strongly engaged or stuck together, and an attempt is made to operate the adjustment lever to adjust the position of the steering wheel, a large force may be required or damage such as deformation may occur to the locking plate and/or the locking member.

In view of the above-mentioned circumstances, an object of the technique according to the present disclosure is to achieve a structure of a steering column device that, in a case where the adjustment lever is operated in order to hold the steering wheel in the adjusted position, even when the positions in the axial direction of a protruding engagement portion and a recessed engagement portion of the locking mechanism are misaligned, the adjustment lever can be operated to the normal position, and it is possible to prevent damage to the locking mechanism.

Solution to Problem

The steering column device according to an aspect of the present disclosure includes:
- a steering column including an inner column, and an outer column having a column-side through hole penetrating in a width direction, arranged on one side in an axial direction of the inner column, and externally fitted so as to displace relative to the inner column in the axial direction;
- an adjustment rod having a cam portion on an outer circumferential surface and inserted into the column-side through hole;
- an adjustment lever fixed to the adjustment rod and configured to rotate the adjustment rod; and
- a locking mechanism including an inner side locking member having a recessed engagement portion at a plurality of locations in the axial direction and provided on the inner column, and an outer side locking member having a protruding engagement portion capable of engaging with the recessed engagement portion.

The outer side locking member includes:
- a first element, at least a portion of which is supported movably toward and away from the inner side locking member;
- a second element having the protruding engagement portion and supported such that the protruding engagement portion is able to displace in an engagement-disengagement direction with respect to the recessed engagement portion;
- a first biasing member elastically biasing at least a portion of the first element in a direction away from the inner side locking member; and
- a second biasing member elastically biasing the second element in a direction such that the protruding engagement portion is able to engaged with the recessed engagement portion with respect to the engagement-disengagement direction.

The cam portion, due to rotation of the adjustment rod in response to operation of the adjustment lever, presses the first element in a direction such that at least a portion of the first element approaches the inner side locking member.

In the steering column device according to an aspect of the present disclosure, the first element may have a stopper portion that, in a state in which the protruding engagement portion is engaged with the recessed engagement portion, is configured to prevent the second element from being displaced with respect to the first element in a biasing direction by the second biasing member.

In the steering column device according to an aspect of the present disclosure, the outer side locking member may have a pivot shaft that is arranged in the width direction and is supported with respect to the outer column so that relative displacement in the axial direction and radial direction of the steering column is not possible, and the first element may be supported so as to pivot about the pivot shaft.

The second element may be supported so as to pivot about the pivot shaft.

The pivot shaft may be arranged at a position closer to the inner side locking member than the adjustment rod with respect to the radial direction of the steering column.

The second biasing member may be arranged on an opposite side of the pivot shaft with the adjustment rod therebetween with respect to the axial direction of the steering column.

The second biasing member may be configured by a compression coil spring.

The steering column device according to an aspect of the present disclosure may further include a coupling member configured to support the inner side locking member with respect to the inner column so as to detach due to an impact load accompanying a secondary collision.

The steering column device according to an aspect of the present disclosure may further include a guide surface portion that is inclined in a direction toward the one side in the axial direction as going outward in the radial direction on at least one of a surface of the one side in the axial direction of the recessed engagement portion and a tip-end surface of the protruding engagement portion.

The second element may have a shoulder portion at a portion located on the one side in the axial direction of the protruding engagement portion, the shoulder portion closely facing or coming in contact with a portion of the inner side locking member that is deviated in the axial direction from the recessed engagement portion in a state in which the protruding engagement portion is engaged with the recessed engagement portion Effect of Invention With the steering column device according to an aspect of the present disclosure, in a case where the adjustment lever is operated in order to hold the steering wheel at the adjusted position, even when the positions in the axial direction of the protruding engagement portion and the recessed engagement portion of the locking mechanism are shifted, the adjustment lever can be operated to the normal position, and it is possible to prevent the locking mechanism from being damaged.

BRIEF DESCRIPTION OF DRAWINGS

FIG. 11 is an enlarged view of section F in FIG. 6, and illustrates a locked state.

DESCRIPTION OF EMBODIMENTS

Figure 1:
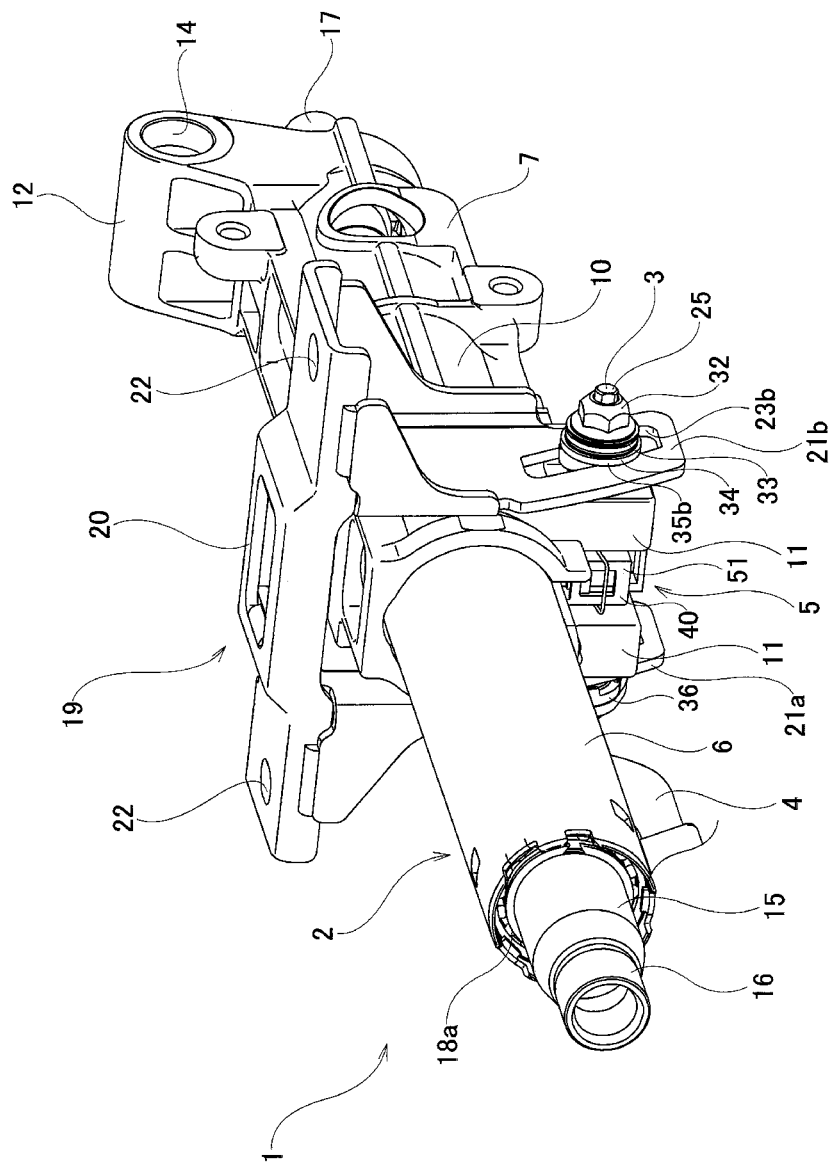
FIG. 1 is a perspective view, as viewed from the rear and above, of a steering column device according to a first example of an embodiment according to the present disclosure.
Figure 2:
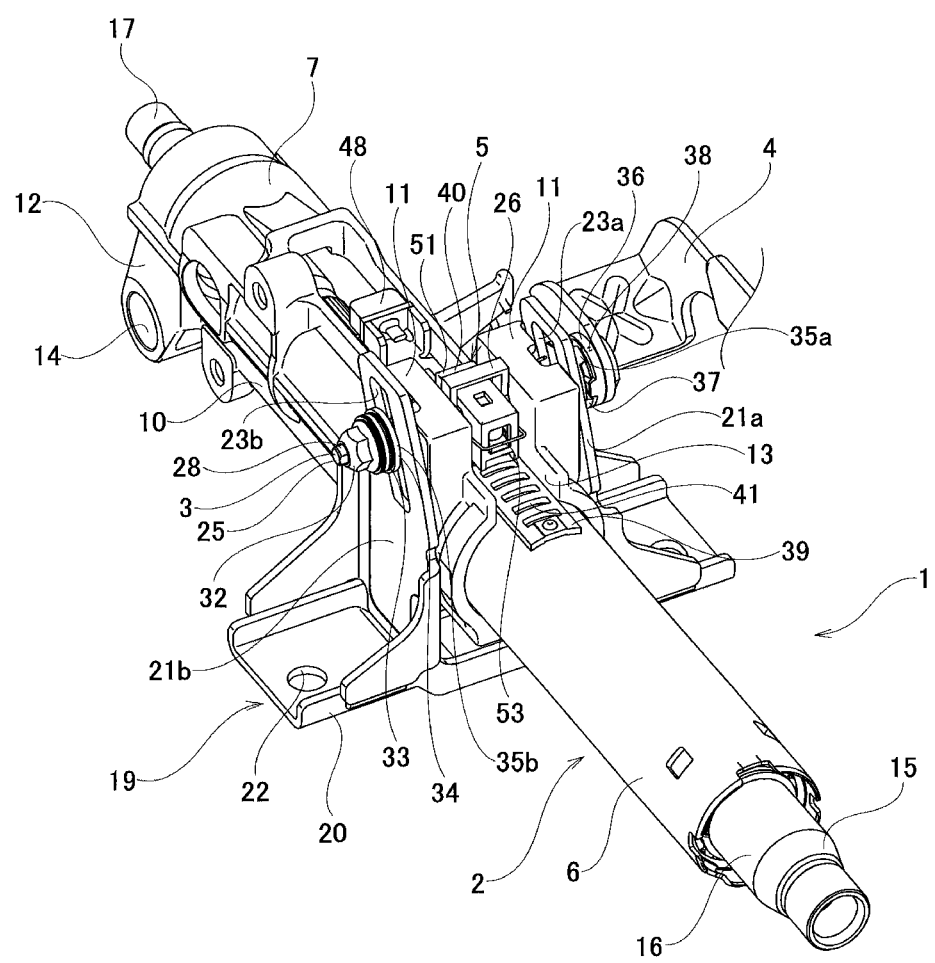
FIG. 2 is a perspective view of the steering column device of the first example, as viewed from the rear and below.
Figure 3:
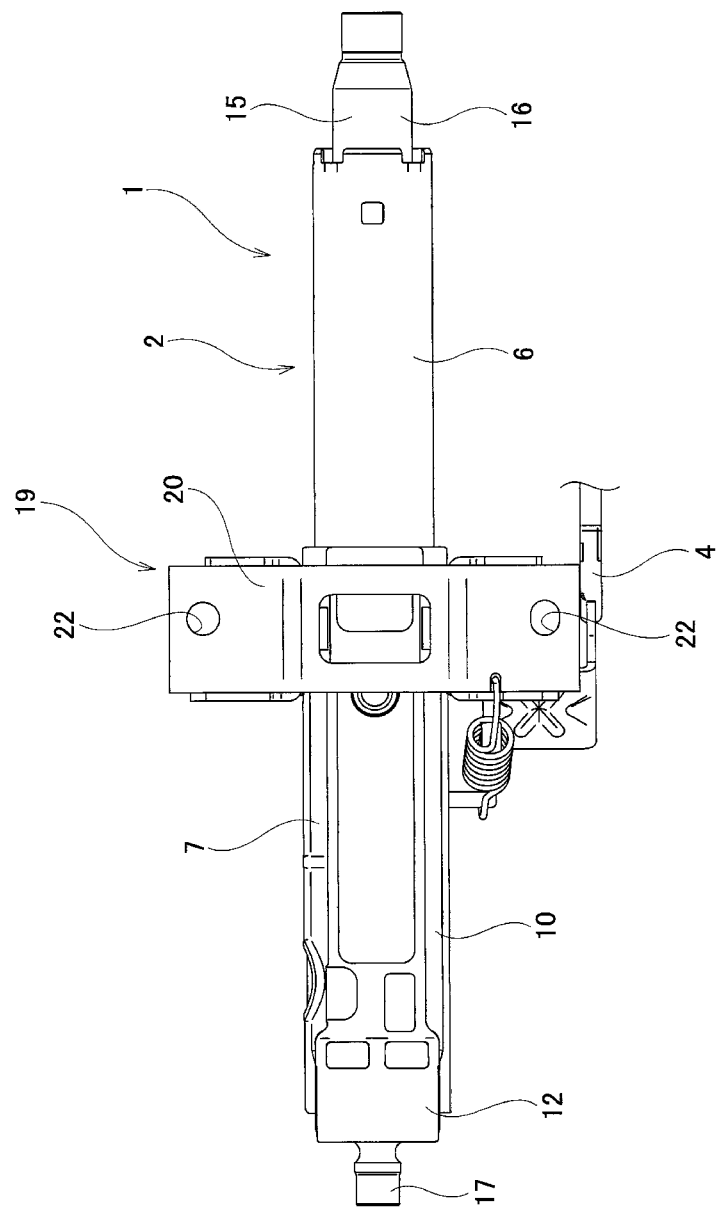
FIG. 3 is a plan view of the steering column device of the first example.
Figure 4:
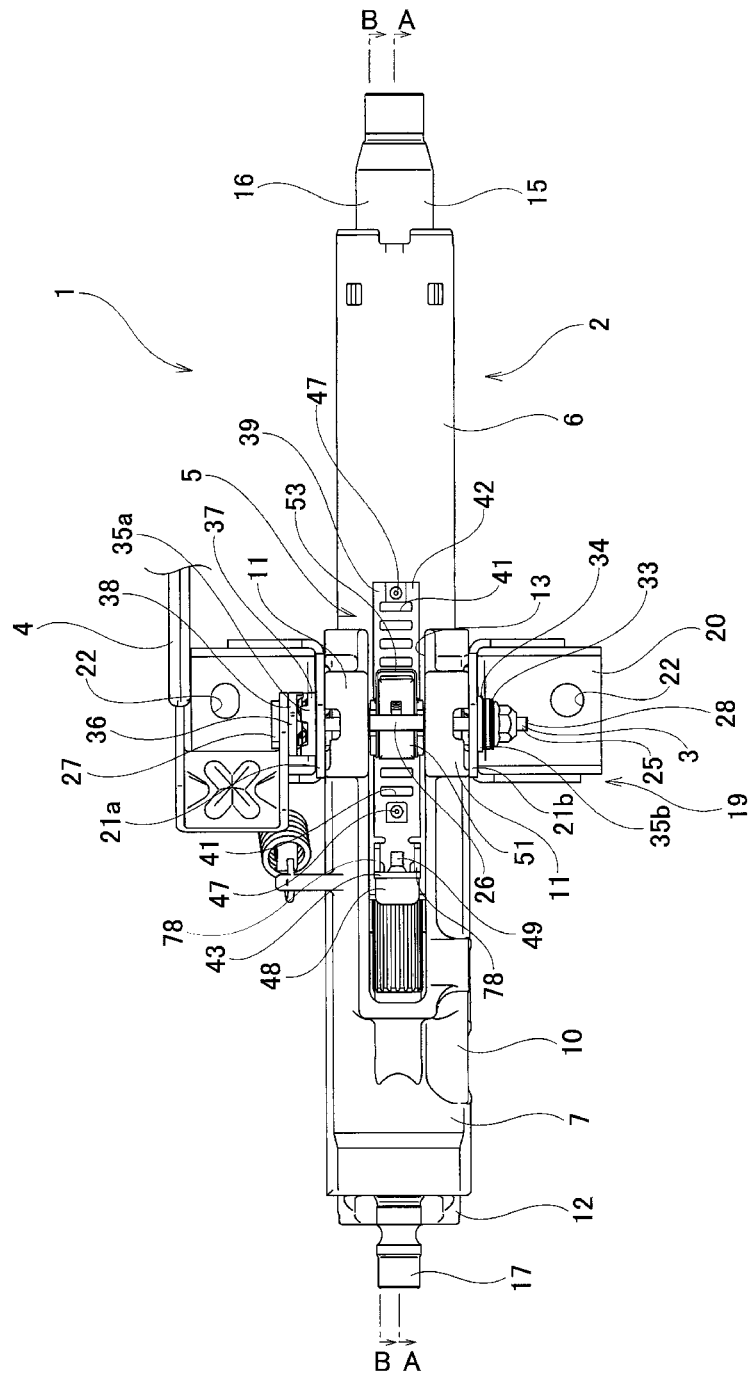
FIG. 4 is a bottom view of the steering column device of the first example.
Figure 5:
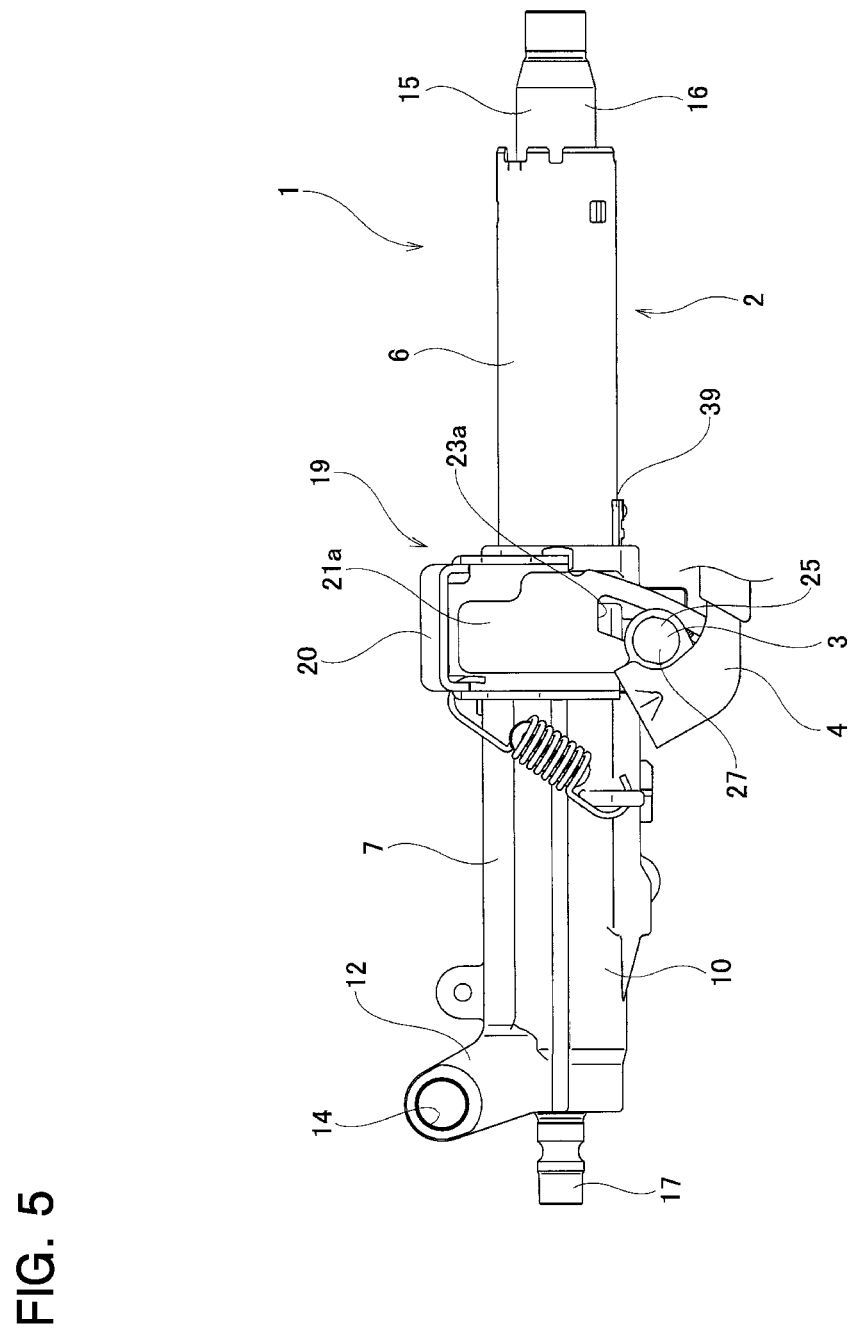
FIG. 5 is a side view of the steering column device of the first example.

Hereinafter, a steering column device of an embodiment according to the present disclosure will be described with reference to the drawings; however, the following description merely describes one example, and the content according to the present disclosure is not limited to the following exemplary configuration. In addition, it is also possible to use known alternative members for each of the elements of the steering column device.

First Example

FIG. 1 to FIG. 20 illustrate a steering column device according of a first example of an embodiment according to the present disclosure. The steering column device 1 of this example includes a steering column 2, an adjustment rod 3, an adjustment lever 4, and a locking mechanism 5. In the following description, unless otherwise specified, the front-rear direction, the up-down direction, and the width direction refer to the front-rear direction, the up-down direction, and the width direction of a vehicle body when the steering column device 1 is attached to the vehicle body. Moreover, unless otherwise specified, the axial direction and the radial direction refer to the axial direction and the radial direction of the steering column 2. In the present example, the front side corresponds to one side in the axial direction, and the rear side corresponds to the other side in the axial direction.

The steering column 2 includes an inner column 6, and an outer column 7 having a column-side through hole 9 passing through in the width direction, and that is arranged on one side in the axial direction of the inner column 6, and is externally fitted so as to displace in the axial direction relative to the inner column 6. That is, the steering column 2 is configured by combining the inner column 6 and the outer column 7 such that the entire length thereof can be expanded and contracted. In the present example, the inner column 6 is arranged on the rear side, and the outer column 7 is arranged on the front side. More specifically, the steering column 2 is configured by externally fitting a rear portion of the outer column 7 onto a front portion of the inner column 6 so as to allow relative displacement in the axial direction.

The inner column 6 has a cylindrical shape. In the present example, the inner column 6 has a coupling hole 8 at two positions spaced apart in the axial direction on a lower surface thereof for connecting and fixing an inner side locking member 39 to the inner column 6 so as to be detachable by an impact load caused by a secondary collision.

The outer column 7 includes a column main body 10, a pair of held portions 11, and a front support bracket 12.

The column main body 10 has a substantially cylindrical shape. In addition, the column main body 10 also has a slit 13 extending in the axial direction on a lower surface of the rear portion. A rear end portion of the slit 13 is open to a rear end surface of the column main body 10.

The pair of held portions 11 are fixedly provided on the lower surface of the column main body 10 at a portion that sandwiches the slit 13 from both sides in the width direction (both sides in the circumferential direction of the column main body 10). Each held portion 11 has a column-side through hole 9 passing through in the width direction. In the present example, the column-side through hole 9 is configured by a circular hole.

The front support bracket 12 is fixed to an upper surface of the front end portion of the column main body 10. The front support bracket 12 has a pivot hole 14 passing through in the width direction.

A steering shaft 15 is rotatably supported inside the steering column 2. The steering shaft 15 is formed by combining an upper shaft 16 and a lower shaft 17 through a spline engagement or the like so that torque can be transmitted and the entire length can be expanded and contracted. The upper shaft 16 is rotatably supported inside the inner column 6 by a radial rolling bearing 18a, and the lower shaft 17 is rotatably supported inside the outer column 7 by another radial rolling bearing 18b. A steering wheel (not illustrated) is supported by and fixed to a rear end portion of the steering shaft 15, that is, a rear end portion of the upper shaft 16. In addition, a front end portion of the steering shaft 15, that is, a front end portion of the lower shaft 17, is connected to an input shaft of a steering gear unit through an intermediate shaft and a universal joint.

A front end portion of the steering column 2, that is, a front end portion of the outer column 7, is supported by the vehicle body so as to pivotally displace around a tilt shaft inserted through the pivot hole 14.

An intermediate portion of the steering column 2, that is, a rear portion of the outer column 7 is supported so as to displace in the up-down direction with respect to a vehicle body side bracket 19 that is supported by and fixed to the vehicle body. The vehicle body side bracket 19 has a mounting plate portion 20 and a pair of support plate portions 21a, 21b.

The mounting plate portion 20 has mounting holes 22 that penetrate in the up-down direction at two positions spaced separated in the width direction, and is supported by and fixed to the vehicle body by bolts inserted through the mounting holes 22.

The pair of support plate portions 21a, 21b hang downward from two positions in the width direction on a lower surface of the mounting plate portion 20, and are arranged so as to hold the pair of held portions 11 of the outer column 7 from both sides in the width direction. The pair of support plate portions 21a, 21b have elongated tilt holes 23a. 23b extending in the up-down direction at mutually aligned portions. In the present example, the elongated tilt holes 23a, 23b have a partially arc-shaped opening shape centered on a tilt shaft.

The adjustment rod 3 has a cam portion 24 on the outer circumferential surface of an intermediate portion in the axial direction (intermediate portion in the width direction) of the adjustment rod 3, and is inserted in the width direction through the column-side through hole 9 provided in the outer column 7 and the elongated tilt holes 23a, 23b provided in the pair of support plate portions 21a, 21b. In the present example, the adjustment rod 3 includes a rod main body 25 and a cam member 26.

The rod main body 25 has a head portion 27 and a shaft portion 28.

The shaft portion 28 has a non-circular cross-sectional shape. More specifically, in the present example, the shaft portion 28 has a width across flats shape.

The cam member 26 includes a pair of arm portions 29 each having a substantially arrow shape, and a connecting portion 30 that connects the base end portions of the pair of arm portions 29 to each other. The pair of arm portions 29 have fitting holes 31 in mutually aligned portions into which the shaft portion 28 of the rod main body 25 is externally fitted without looseness. The cam portion 24 is configured by tip end portions (upper end portions) of the pair of arm portions 29 of the cam member 26.

The shaft portion 28 of the rod main body 25 of the adjustment rod 3 is inserted into the column-side through hole 9 provided in the outer column 7 and the elongated tilt holes 23a, 23b provided in the pair of support plate portions 21a, 21b from one side in the width direction (lower side in FIG. 3, upper side in FIG. 4, left side in FIG. 8 to FIG. 10), and a nut 32 is screwed onto the tip portion (the end portion on the other side in the width direction) of the shaft portion 28. A thrust bearing 33 and a washer 34 are arranged around the shaft portion 28 between the support plate portion 21b on the other side in the width direction (the upper side in FIG. 3, the lower side in FIG. 4, the right side in FIG. 8 to FIG. 10) of the pair of support plate portions 21a, 21b and the nut 32, in order from the nut 32 side.

The steering column device 1 of the present example includes a pair of pressing portions 35a, 35b around the adjustment rod 3 and at positions sandwiching the pair of support plate portions 21a, 21b from both sides in the width direction, and an expansion/contraction mechanism 36 around the adjustment rod 3 that expands/contracts a distance between the pair of pressing portions 35a, 35b. The steering column device 1, based on an operation of the adjustment lever 4, expands or contracts the distance between the pair of pressing portions 35a, 35b by the expansion/contraction mechanism 36, and by switching the engagement state of the locking mechanism 5, is configured to switch between a state in which the front-rear position and the up-down position of the steering wheel supported by and fixed to the rear end of the steering shaft 15 can be adjusted, and a state in which the steering wheel is held at the adjusted position.

The expansion/contraction mechanism 36 is configured by a cam device including a driven cam 37 and a driving cam 38.

The driven cam 37, on a surface on the one side in the width direction, has a driven cam surface that is an uneven surface in the circumferential direction, and is externally fitted onto the adjustment rod 3 so as to rotate and displace (displace in the axial direction of the adjustment rod 3) relative to the adjustment rod 3. In addition, the driven cam 37 engages a protruding engagement portion provided at a portion on the other side in the width direction with the elongated tilt hole 23a provided in the support plate portion 21a of the pair of support plate portions 21a, 21b that is on the one side in the width direction so as to displace only along the elongated tilt hole 23a.

The driving cam 38 has a driving cam surface that is an uneven surface in the circumferential direction on a surface on the other side in the width direction facing the driven cam surface of the driven cam 37, and is externally fitted and fixed to the adjustment rod 3 so as to be unable to rotate or displace in the width direction relative to the adjustment rod 3.

The adjustment lever 4 is fixed to the adjustment rod 3 and has the function of rotating the adjustment rod 3. More specifically, a base end portion of the adjustment lever 4 is coupled and fixed to the driving cam 38 that is externally fitted and fixed to the adjustment rod 3. Therefore, when the adjustment lever 4 is operated, the adjustment rod 3 and the driving cam 38 rotate around a central axis of the adjustment rod 3.

By operating the adjustment lever 4 to expand or contract the dimension in the axial direction of the expansion/contraction mechanism 36, that is, the dimension in the width direction of the vehicle body, and expand or contract the distance between the driven cam 37 and the washer 34, the distance between the pair of support plate portions 21a, 21b can be expanded or contracted. In other words, the driven cam 37 forms the pressing portion 35a on the one side in the width direction, and the washer 34 forms the pressing portion 35b on the other side in the width direction.

The locking mechanism 5 has an inner side locking member 39 and an outer side locking member 40.

The inner side locking member 39 has a recessed engagement portion 41 at a plurality of locations in the axial direction, and is provided in the inner column 6. More specifically, the inner side locking member 39 has a substantially rectangular plate-shaped base plate portion 42 extending in the axial direction, and a bent plate portion 43 bent outward (downward) in the radial direction from the front end portion of the base plate portion 42.

The base plate portion 42 has the recessed engagement portion 41 at multiple locations in the axial direction, the respective engagement portion 41 being configured by a substantially long rectangular hole that penetrates in the plate thickness direction (up-down direction) and whose opening shape extends in the width direction. The recessed engagement portion 41 has an inner-side guide surface portion 44 on a lower portion of a front side surface that is inclined in a direction toward the front as going downward, and has an inner-side flat surface portion 75 orthogonal to the central axis of the inner column 6 on a rear side surface. The base plate portion 42 has coupling holes 45 penetrating in the plate thickness direction at a portion farther on the front side and at a portion farther on the rear side than the portion where the recessed engagement portions 41 are provided.

The bent plate portion 43 has a through hole 46 penetrating in the plate thickness direction (front-rear direction).

The inner side locking member 39 is supported by the inner column 6 by a coupling member 47 so as to detach based on an impact load applied due to a secondary collision. More specifically, the coupling member 47 is press-fitted or inserted so as to span between a coupling hole 8 provided in a lower surface of the inner column 6 and a coupling hole 45 provided in the inner side locking member 39. The coupling member 47 is made of synthetic resin, light alloy, steel, or the like, and breaks due to an impact load applied during a secondary collision.

In the present example, by pressing fitting a pin portion 49 provided on a damper 48 made of an elastic material such as an elastomer including rubber into a through hole 46 of the bent plate portion 43 from the front side, the damper 48 is supported by and fixed to a front end portion of the inner side locking member 39. Therefore, when the steering wheel is moved to a front end position of an adjustable range of the steering wheel, a front end surface of the damper 48 comes into contact with a front end surface (deep end portion) of the slit 13 of the outer column 7. As a result, when the steering wheel is moved to a front end position of the adjustable range, the inner column 6 or a metal member supported by the inner column 6 and the outer column 7 or a metal member supported by the outer column 7 are prevented from a direct collision (metal contact).

The outer side locking member 40 has a protruding engagement portion 65 that can engage with the recessed engagement portion 41. More specifically, the outer side locking member 40 is configured by: a first element 51 at least a portion of which is supported so as to be movable toward and away from the inner side locking member 39; a second element 52 that has the protruding engagement portion 65 and is supported such that the protruding engagement portion 65 is able to displace in the engagement-disengagement direction with respect to the recessed engagement portion 41; a first biasing member 53 that elastically biases at least a portion of the first element 51 in a direction away from the inner side locking member 39; and a second biasing member 54 that elastically biases the second element 52 in a direction such that the protruding engagement portion 65 is engaged with the recessed engagement portion 41 with respect to the engagement-disengagement direction.

In the present example, the outer side locking member 40 includes a pivot shaft 50 as an element for enabling the first element 51 to move toward or away from the inner side locking member 39, and for enabling the second element 52 to be displaced in the engagement-disengagement direction. The pivot shaft 50 is arranged in the width direction, and is supported by the outer column 7 so as not to displace relative to the outer column 7 in the axial direction and the radial direction (front-rear direction and up-down direction). The pivot shaft 50 has a cylindrical shape, and end portions on both sides in the width direction of the pivot shaft 50 (end portions on both sides in the axial direction of the pivot shaft 50) are internally fitted into support holes 55 of the pair of held portions 11 that penetrate in the width direction at a portion on the front and upper side of the column-side through hole 9. In the present example, by press fitting, an end portion on the one side in the width direction of the pivot shaft 50 into the support hole 55 provided in the held portion 11 on the one side in the width direction, and by inserting (internally fitting with a clearance fit) an end portion on the other side in the width direction of the pivot shaft 50 into the support hole 55 provided in the held portion 11 on the other side in the width direction, the pivot shaft 50 is supported by the outer column 7.

The first element 51 is supported by the pivot shaft 50 so as to pivot about the pivot shaft 50. In the present example, the first element 51 is configured in a substantially rectangular box shape and includes a pair of side plate portions 56, a connecting plate portion 57, and an end plate portion 58.

The pair of side plate portions 56 are arranged parallel to each other and spaced apart from each other in the width direction. The side plate portions 56 have through holes 59 penetrating in the plate thickness direction (width direction) in the respective substantially central portions aligned with each other, and have support holes 60 penetrating in the plate thickness direction at portions aligned with each other on the front and upper side of the through holes 59. The side plate portions 56 have cylindrical portions 61 that protrude outward in the width direction from portions of outer side surfaces in the width direction surrounding the support holes 60. The inner circumferential surface of the support hole 60 and the inner circumferential surfaces of the cylindrical portions 61 are configured by the same cylindrical surface. Furthermore, the side plate portions 56 have locking pieces 62 that protrude outward in the width direction from intermediate portions in the front-rear direction of the upper end portions.

The connecting plate portion 57 connects the lower end portions of the pair of side plate portions 56. The connecting plate portion 57 has a spring locking portion 63 having a partially cylindrical shape that protrudes upward from a rear portion of the upper side surface.

The end plate portion 58 connects the rear end portions of the pair of side plate portions 56. A lower end portion of the end plate portion 58 is connected to a rear end portion of the connecting plate portion 57. The end plate portion 58 has a rectangular hole 64 approximately in a central portion thereof that penetrates in the plate thickness direction (front-rear direction).

The first element 51 is supported by the outer column 7 so as to pivot about the pivot shaft 50 by internally fitting the pivot shaft 50 into the support hole 60 and the cylindrical portion 61 without looseness. In this state, the rear portion of the first element 51 is able to move toward and away from the inner side locking member 39. The adjustment rod 3 is inserted through the through holes 59 provided in the pair of side plate portions 56 so as to rotate relative to the first element 51.

The protruding engagement portion 65 that is able to engage with the recessed engagement portions 41 of the inner side locking member 39 is provided on the second element 52. The second element 52 is supported by the outer column 7 so that the protruding engagement portion 65 is able to displace in the engagement-disengagement direction with respect to the recessed engagement portions 41. More specifically, the second element 52 has a support hole 66 penetrating in the width direction at a base end portion (front end portion), and has the protruding engagement portion 65 at an upper end portion of a portion on the tip end side (rear portion). The protruding engagement portion 65 has an outer guide surface portion 67 on the tip end surface (upper side surface) that is inclined downward as going toward the front side, and has an outer side flat surface portion 76 on the rear side surface thereof, which is substantially orthogonal to the central axis of the inner column 6 in a state in which the protruding engagement portion 65 and the recessed engagement portion 41 are engaged.

The second element 52, at a portion located on the one side in the axial direction of the protruding engagement portion 65, more specifically, at a portion of the upper side surface located on the front side of the protruding engagement portion 65, has a shoulder portion 77 that, in a state in which the protruding engagement portion 65 and the recessed engagement portion 41 are engaged, closely faces or comes in contact with a portion of the inner side locking member 39 that is deviated in the axial direction from the recessed engagement portion 41, more specifically, a portion of the lower side surface of the base plate portion 42 of the inner side locking member 39 that is deviated in the axial direction from the recessed engagement portion 41. Furthermore, the second element 52, on a lower side surface of a portion on the tip end side, has a spring locking portion 68 having a cylindrical shape that protrudes downward, and, at the tip end portion (rear end portion), has a stopper piece 69 that protrudes toward the rear.

The second element 52, by the pivot shaft 50 being internally fitted inside the support hole 66 without looseness, is supported so as to pivot about the pivot shaft 50. In this state, the stopper piece 69 of the second element 52 is arranged inside the rectangular hole 64 of the first element 51.

The first element 51 has a stopper portion that, in a state in which the protruding engagement portion 65 is engaged with the recessed engagement portion 41, prevents the second element 52 from being displaced with respect to the first element 51 in the biasing direction by the second biasing member 54. More specifically, when the second element 52 pivots upward with respect to the first element 51, an upper side surface of the stopper piece 69 of the second element 52 comes in contact with an upper side surface (surface facing downward) of the rectangular hole 64 of the first element 51, and the second element 52 is prevented from pivoting further upward with respect to the first element 51. That is, the upper side surface of the rectangular hole 64 of the first element 51 forms a stopper portion.

A first biasing member 53 elastically biases a rear portion of the first element 51 in a direction away from the inner side locking member 39. The first biasing member 53 is configured by bending and forming an elastic metal wire. The first biasing member 53 has a base portion 70, a pair of extending arm portions 71, a pair of folded portions 72, and a pair of locking arm portions 73.

The base portion 70 extends in the width direction.

The pair of extending arm portions 71 are bent toward the front from end portions on both sides in the width direction of the base portion 70, and are bent into a substantially S-shape (substantially crank-shape) when viewed from the side.

The pair of folded portions 72 are folded upward and toward the rear from the tip end portions (front end portions) of the extending arm portions 71 in a substantially U-shape.

The pair of locking arm portions 73 extend toward the rear from an upper end portion of the folded portions 72, and have bent portions 74 bent downward at the tip end portions (rear end portions).

The first biasing member 53 causes the pair of extending arm portions 71 to elastically come in contact with the lower side surface of the adjustment rod 3, and also causes the pair of locking arm portions 73 to elastically come in contact with the upper side surfaces of the locking pieces 62 of the first element 51. In this state, the base portion 70 is arranged on the rear side of the end plate portion 58 of the first element 51, and the pair of folded portions 72 are arranged on the front side of the cylindrical portions 61. The first biasing member 53, by a force acting to elastically restore the pair of extending arm portions 71 and the pair of locking arm portions 73 in a direction toward each other, elastically presses the locking pieces 62 of the first element 51 downward. Thus, the first biasing member 53 elastically biases the portion on the rear side of the first element 51 in a direction away from the inner side locking member 39.

The second biasing member 54, with respect to the engagement-disengagement direction of the protruding engagement portion 65 with regards to the recessed engagement portion 41 of the inner side locking member 39, elastically biases the second element 52 in a direction causing the protruding engagement portion 65 to engage with the recessed engagement portion 41. The second biasing member 54 is configured by a compression coil spring that has substantially linear spring characteristics and whose initial load can be easily adjusted. The second biasing member 54 is elastically held between an upper side surface of the connecting plate portion 57 of the first element 51 and a lower side surface of a tip-end portion of the second element 52. That is, of the second biasing member 54, a lower end portion is locked to the spring locking portion 63 provided on the connecting plate portion 57 (the spring locking portion 63 is inserted into the lower end portion), and an upper end portion is locked to the spring locking portion 68 provided on the lower surface of the portion on the tip end side of the second element 52 (the spring locking portion 68 is inserted into the upper end portion). Thus, the tip-end portion of the second element 52 is elastically biased upward.

The second biasing member 54 is arranged on the opposite side of the pivot shaft 50 across from the adjustment rod 3 in the axial direction. That is, the second biasing member 54 is arranged farther on the rear side than the adjustment rod 3, and the pivot shaft 50 is arranged farther on the front side than the adjustment rod 3.

In the steering column device 1 of the present example, when adjusting the up-down and/or front-rear positions of the steering wheel, the locking mechanism 5, based on operating the adjustment lever 4 in a predetermined direction (clockwise in the example of FIG. 5), is brought into the unlocked state, and the pair of pressing portions 35a, 35b become unclamped by widening the distance therebetween.

Figure 14:
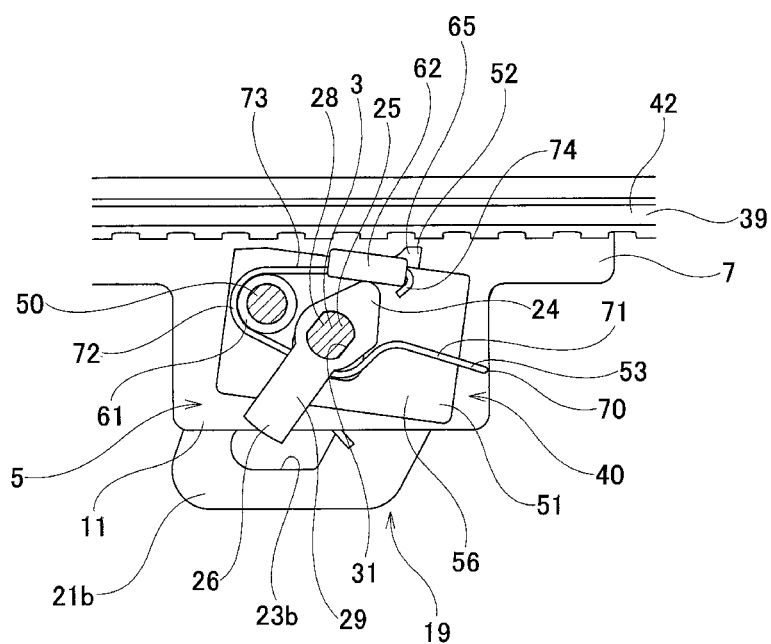
FIG. 14 is an enlarged view of section G in FIG. 7, and illustrates an unlocked state.
Figure 15:
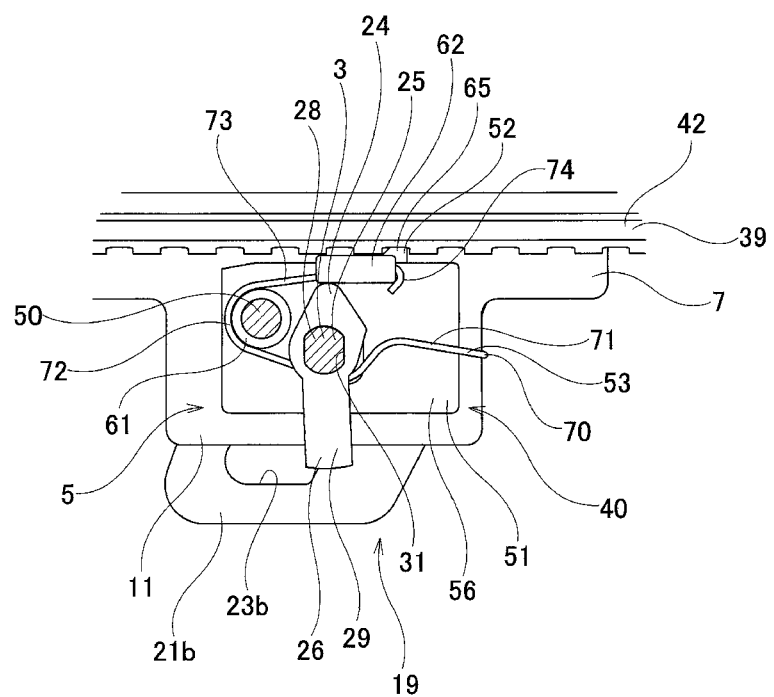
FIG. 15 is an enlarged view of section G in FIG. 7, and illustrates a locked or semi-locked state.

That is, by operating the adjustment lever 4 in a predetermined direction, the cam member 26 of the adjustment rod 3 is pivoted from a state illustrated in FIG. 15 to a state illustrated in FIG. 14, and the cam portion 24 releases the force that presses the locking pieces 62 of the first element 51 upward. As a result, the locking pieces 62 are elastically pressed downward by the elastic restoring force of the first biasing member 53, and the first element 51 pivots about the pivot shaft 50 in a direction in which the rear portion of the first element 51 moves away from the inner side locking member 39, that is, clockwise in FIGS. 14 and 15. Therefore, the upper side surface of the rectangular hole 64 of the first element 51 presses the upper side surface of the stopper piece 69 of the second element 52 downward. As a result, by the second element 52 pivoting in a clockwise direction in FIG. 11 and FIG. 12 from a state illustrated in FIG. 12 to a state illustrated in FIG. 11, the protruding engagement portion 65 and the recessed engagement portion 41 become disengaged.

By operating the adjustment lever 4 in a predetermined direction, the driving cam 38 of the expansion/contraction mechanism 36 is rotated, and protruding portions of a driving cam surface of the driving cam 38 and protruding portions of the driven cam surface of the driven cam 37 are alternately arranged. Thus, the dimension in the axial direction of the expansion/contraction mechanism 36 is reduced, the distance between the pair of pressing portions 35a, 35b (driven cam 37 and washer 34) is increased, and an unclamped state is established. As a result, contact pressure between inner surfaces in the width direction of the pair of support plate portions 21*a*, 21*b* and the outer surfaces in the width direction of the pair of held portions 11 is reduced or lost, and the inner diameter of a rear portion of the outer column 7 expands elastically, and the contact pressure between the outer circumferential surface of the front portion of the inner column 6 and the inner circumferential surface of the rear portion of the outer column 7 decreases.

In this manner, when the locking mechanism 5 is set to the unlocked state and the pair of pressing portions 35*a*, 35*b* are set to the unclamped state with the distance therebetween widened, it becomes possible to adjust the front-rear position and the up-down position of the steering wheel.

In the present example, a front end position of the adjustable range of the steering wheel is regulated by contact between a front side surface of the damper 48 supported by the front end portion of the inner side locking member 39 and the front end portion (deep end portion) of the slit 13 provided in the outer column 7. That is, when the steering wheel is moved to the front end position of the adjustable range, the front side surface of the damper 48 and the front end portion of the slit 13 come into contact. On the other hand, the rear end position of the adjustable range of the steering wheel is regulated by contact between the rear end surface of a pair of lateral bent portions 78 that are bent downward from portions on both sides in the width direction of the front end portion of the base plate portion 42 of the inner side locking member 39 and front side surface of the cylindrical portion 61 of first element 51. That is, when the steering wheel is moved to the rear end position of the adjustable range, the rear end surface of the pair of lateral bent portions 78 of the inner side locking member 39 and the front side surface of the cylindrical portion 61 of the first element 51 come into contact.

The up-down position of the steering wheel can be adjusted within a range in which the adjustment rod 3 can move inside the elongated tilt holes 23*a*, 23*b* provided in the pair of support plate portions 21*a*, 21*b*. That is, when the steering wheel is moved to the upper end position of the adjustable range, the upper end portion of the elongated tilt hole 23*a* provided in the support plate portion 21*a* on the one side in the width direction and the upper side surface of the protruding engagement portion of the driven cam 37 externally fitted onto the shaft portion 28 come into contact, and the upper end portion of the elongated tilt hole 23*b* provided in the support plate portion 21*b* on the other side in the width direction and the upper side surface of the shaft portion 28 come into contact. On the other hand, when the steering wheel is moved to the lower end position of the adjustable range, the lower end position of the elongated tilt hole 23*a* provided in the support plate portion 21*a* on the one side in the width direction and the lower side surface of the protruding engagement portion of the driven cam 37 externally fitted onto the shaft portion 28 come into contact, and the lower end portion of the elongated tilt hole 23*b* provided in the support plate portion 21*b* on the other side in the width direction and the lower side surface of the shaft portion 28 come into contact.

After moving the steering wheel to a desired position, the locking mechanism 5 is set to a locked state by operating the adjustment lever 4 in a direction opposite to a predetermined direction (counterclockwise in the example of FIG. 5), and a clamped state is set in which the distance between the pair of pressing portions 35*a*, 35*b* is reduced.

That is, by operating the adjustment lever 4 in the opposite direction to the predetermined direction in order to cause the cam member 26 of the adjustment rod 3 to pivot from the state illustrated in FIG. 14 to the state illustrated in FIG. 15, the cam portion 24 presses the locking pieces 62 of the first element 51 upward. As a result, the first element 51 pivots against the elastic restoring force of the first biasing member 53 about the pivot shaft 50 in a direction in which the rear portion of the first element 51 approaches the inner side locking member 39, that is, counterclockwise direction in FIG. 14 and FIG. 15. Furthermore, by the tip-end portion of the second element 52 being pressed upward by the first element 51 through the second biasing member 54, the second element 52 pivots in the counterclockwise direction in FIG. 11 and FIG. 12 from the state illustrated in FIG. 11 to the state illustrated in FIG. 12, and the protruding engagement portion 65 and the recessed engagement portion 41 engage with each other. As a result, displacement in the axial direction of the inner column 6 with respect to the outer column 7 is prevented.

By operating the adjustment lever 4 in the opposite direction to the predetermined direction, the driving cam 38 of the expansion/contraction mechanism 36 is rotated, and the tip-end surface of the protruding portion of the driving cam surface of the driving cam 38 and the tip-end surface of the protruding portion of the driven cam surface of the driven cam 37 come in contact with each other. As a result, the dimension in the axial direction of the expansion/contraction mechanism 36 is expanded, and the distance between the pair of pressing portions 35*a*, 35*b* (driven cam 37 and washer 34) is shortened, setting a clamped state. As a result, contact pressure between inner surfaces in the width direction of the pair of support plate portions 21*a*, 21*b* and the outer surfaces in the width direction of the pair of held portions 11 is increased, and the inner diameter of a rear portion of the outer column 7 contracts elastically, and the contact pressure between the outer circumferential surface of the front portion of the inner column 6 and the inner circumferential surface of the rear portion of the outer column 7 increases. As a result, displacement in the up-down direction of the outer column 7 with respect to the vehicle body side bracket 19 is prevented, and displacement in the axial direction of the inner column 6 with respect to the outer column 7 is prevented, so that the steering wheel is held at the adjusted position.

Figure 6:
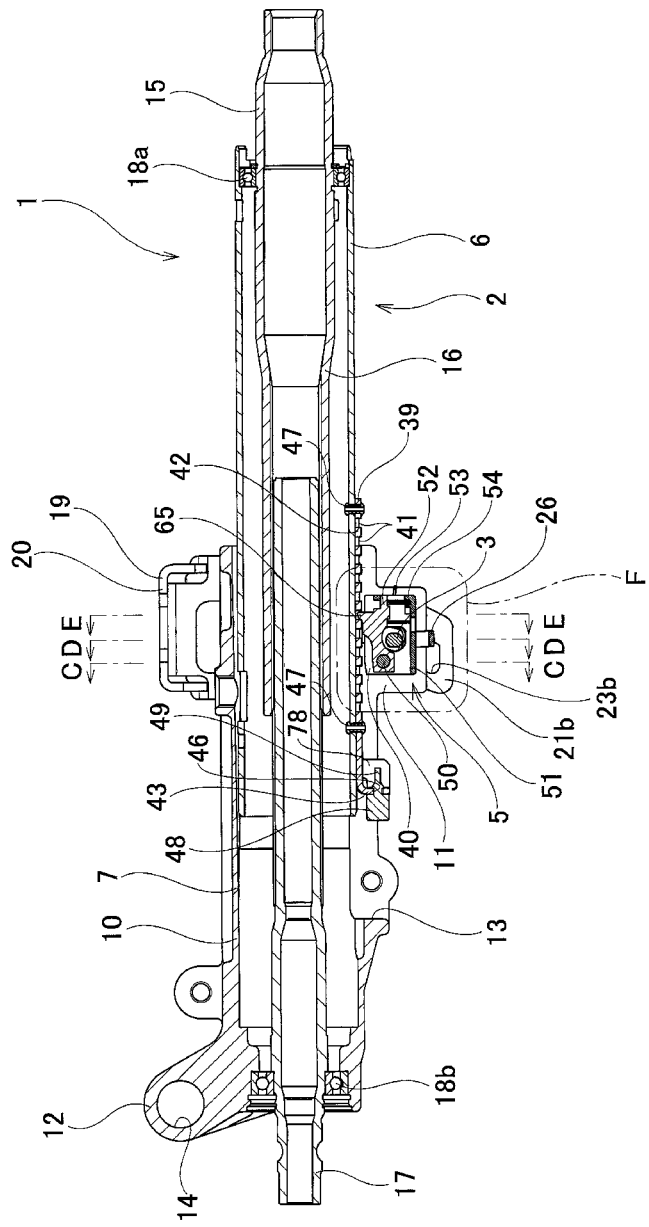
FIG. 6 is a cross-sectional view taken along line A-A in FIG. 4.
Figure 7:
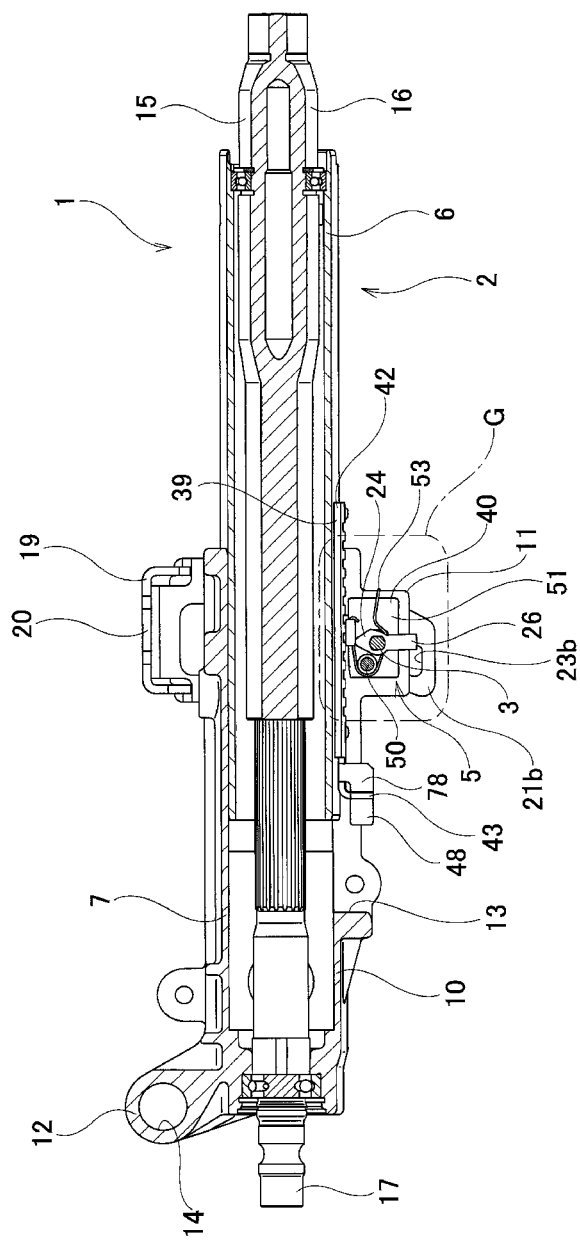
FIG. 7 is a cross-sectional view taken along line B-B in FIG. 4.
Figure 8:
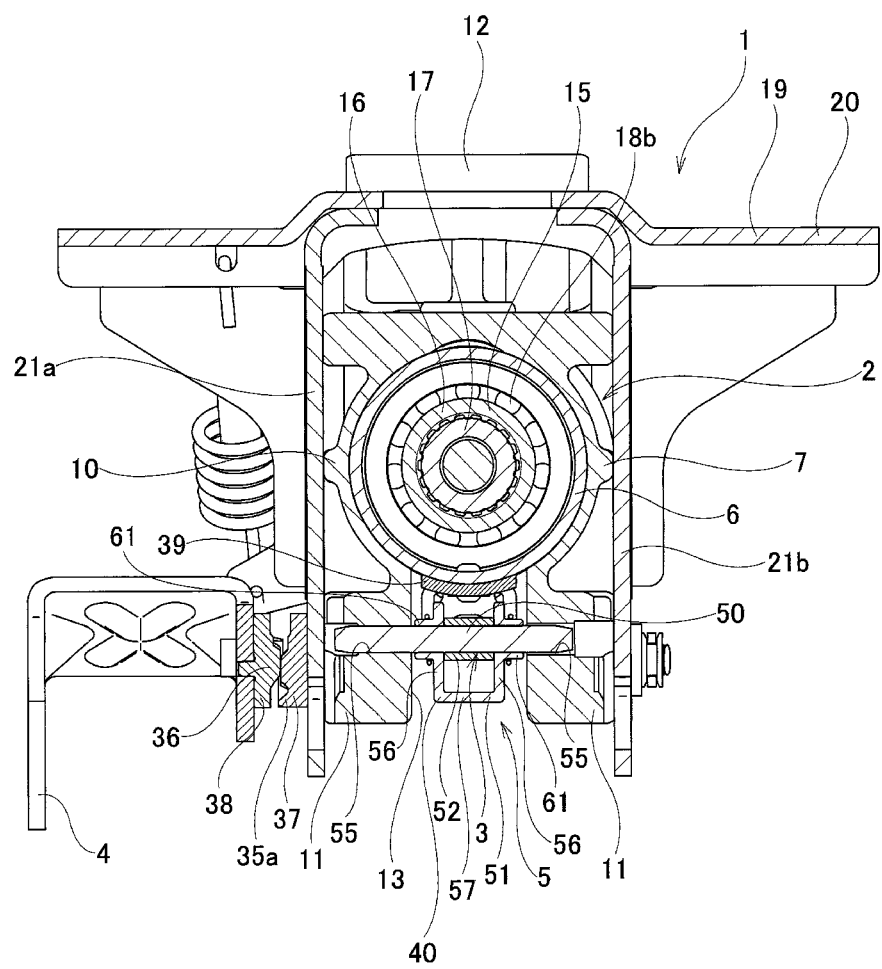
FIG. 8 is a cross-sectional view taken along line C-C in FIG. 6.
Figure 9:
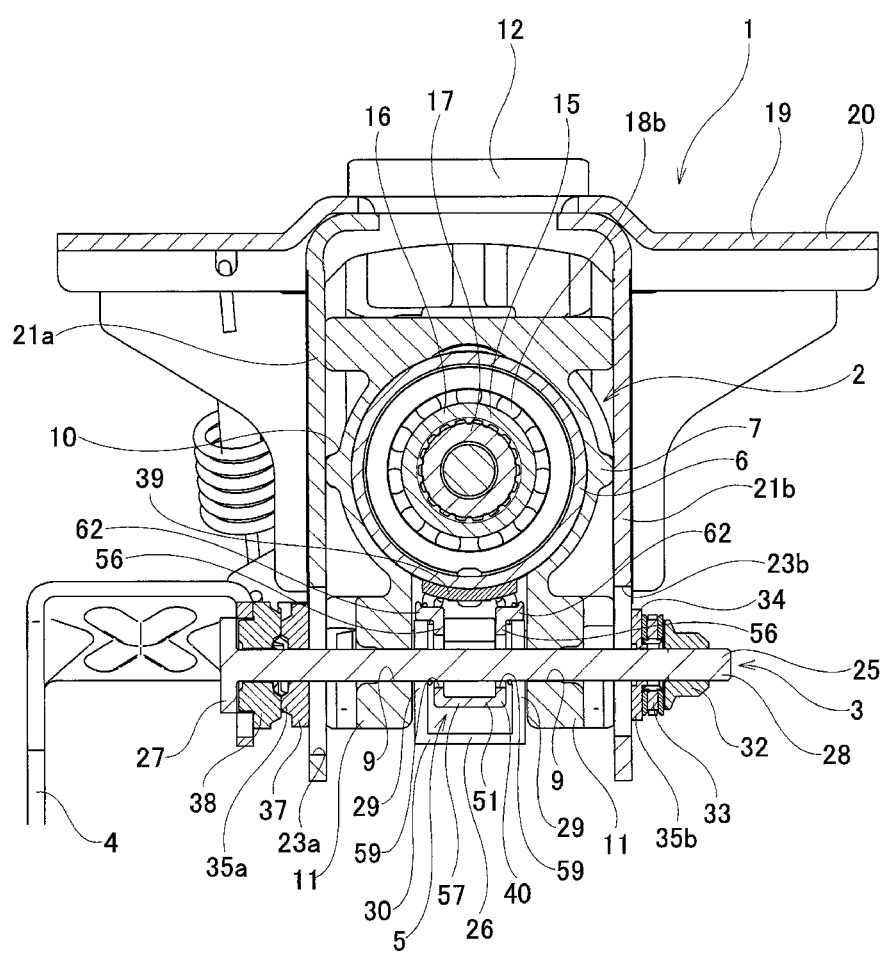
FIG. 9 is a cross-sectional view taken along line D-D in FIG. 6.
Figure 10:
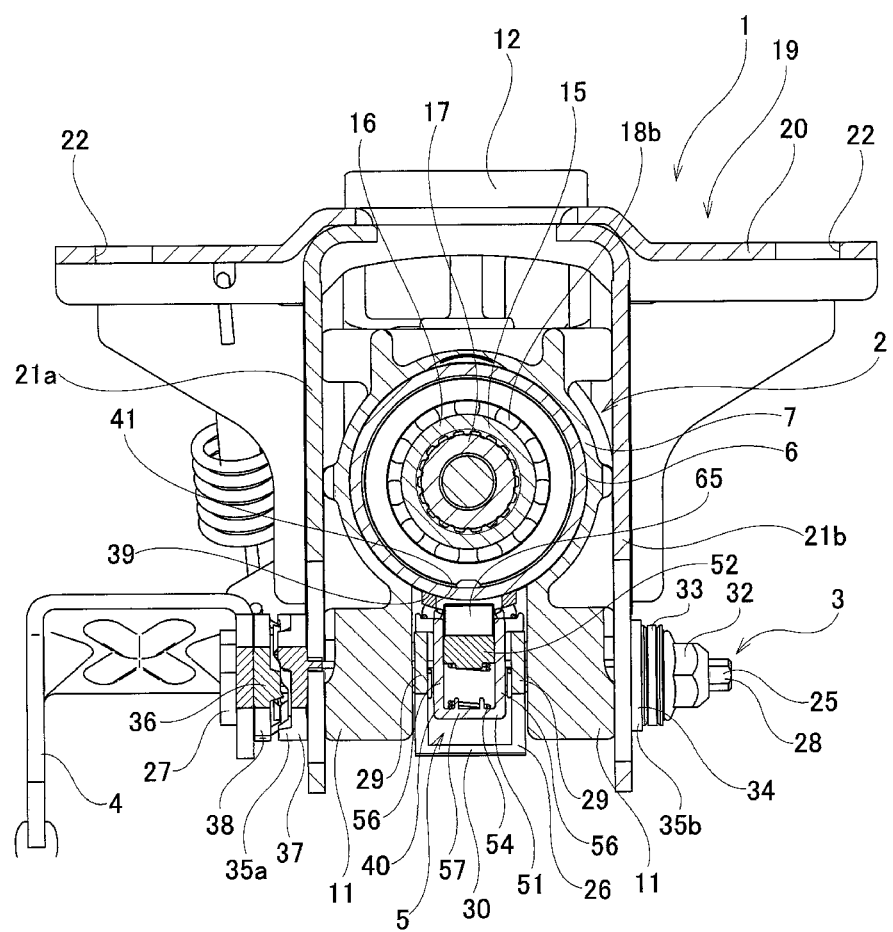
FIG. 10 is a cross-sectional view taken along line E-E in FIG. 6.
Figure 11:
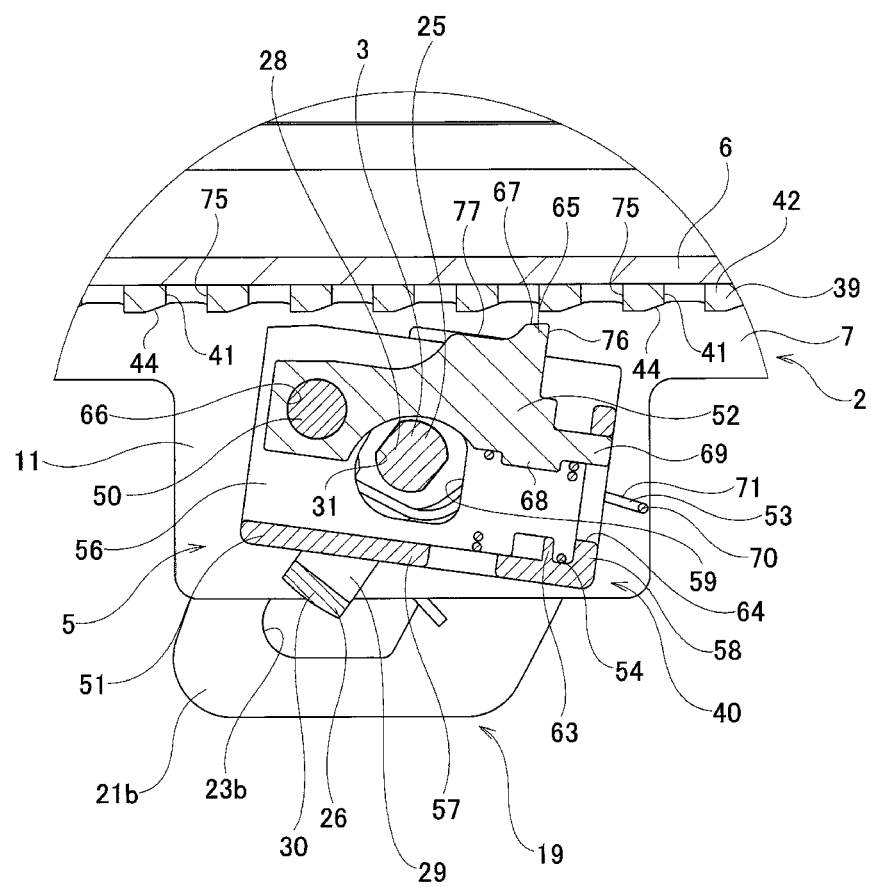
FIG. 11 is an enlarged view of section F in FIG. 6, and illustrates an unlocked state.
Figure 20:
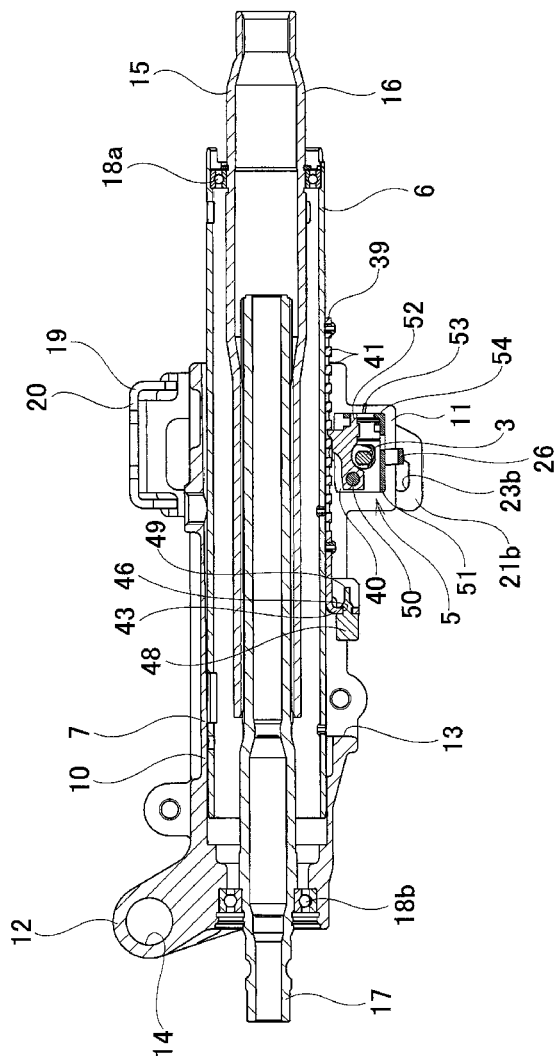
FIG. 20 is a cross-sectional view of the steering column device of the first example in a state where a secondary collision has occurred.

In the steering column device 1 of the present example, in the event of a collision accident, when a secondary collision occurs in which the driver's body collides with the steering wheel, and an impact load in the forward direction is applied from the steering wheel to the inner column 6 through the upper shaft 16, as illustrated in FIG. 6, the coupling member 47 that spans the inner column 6 and the inner side locking member 39 shears as illustrated in FIG. 20. As a result, the steering wheel supported by the inner column 6 through the inner column 6 and the upper shaft 16 is allowed to displace forward, and the impact load applied to the driver's body is alleviated.

With the steering column device 1 of the present example, in a case where the adjustment lever 4 is operated in order to hold the steering wheel at the adjusted position, even when the positions in the axial direction of the protruding engagement portion 65 and the recessed engagement portion 41 are shifted, the adjustment lever 4 can be operated to the normal position, and it is possible to prevent the locking mechanism 5 from being damaged. The reason for this will be explained in the following.

In the steering column device 1, when the adjustment lever 4 is operated in the opposite direction to the predetermined direction in order to hold the steering wheel at the adjusted position, the tip-end surface of the protruding engagement portion 65 of the outer side locking member 40 and a portion of the lower side surface of the base plate portion 42 of the inner side locking member 39 that is deviated in the axial direction from the recessed engagement portion 41 may come in contact. In the steering column device 1 of the present example, when the adjustment lever 4 is further operated in the opposite direction to the predetermined direction from this state, the second element 52 having the protruding engagement portion 65 remains at the same position without pivoting, and the first element 51 pivots in the counterclockwise direction in FIG. 13 about the pivot shaft 50 while causing the second biasing member 54 to elastically deform (elastically contract).

Therefore, even when attempting to further operate the adjustment lever 4 in the opposite direction to the predetermined direction from a state of contact between the tip-end surface of the protruding engagement portion 65 and a portion of the lower side surface of the base plate portion 42 that is deviated in the axial direction from the recessed engagement portion 41, the force required to operate the adjustment lever 4 can be prevented from becoming excessive, and the contact pressure between the protruding engagement portion 65 and the lower side surface of the base plate portion 42 can be prevented from becoming excessive. Therefore, damage such as deformation of the inner side locking member 39 and/or the outer side locking member 40 can be prevented. Thus, the adjustment lever 4 can be operated to the normal position with the steering wheel held at the adjusted position, that is, the adjustment lever 4 can be operated to the end position in the opposite direction to the predetermined direction within the operable range.

Figure 12:
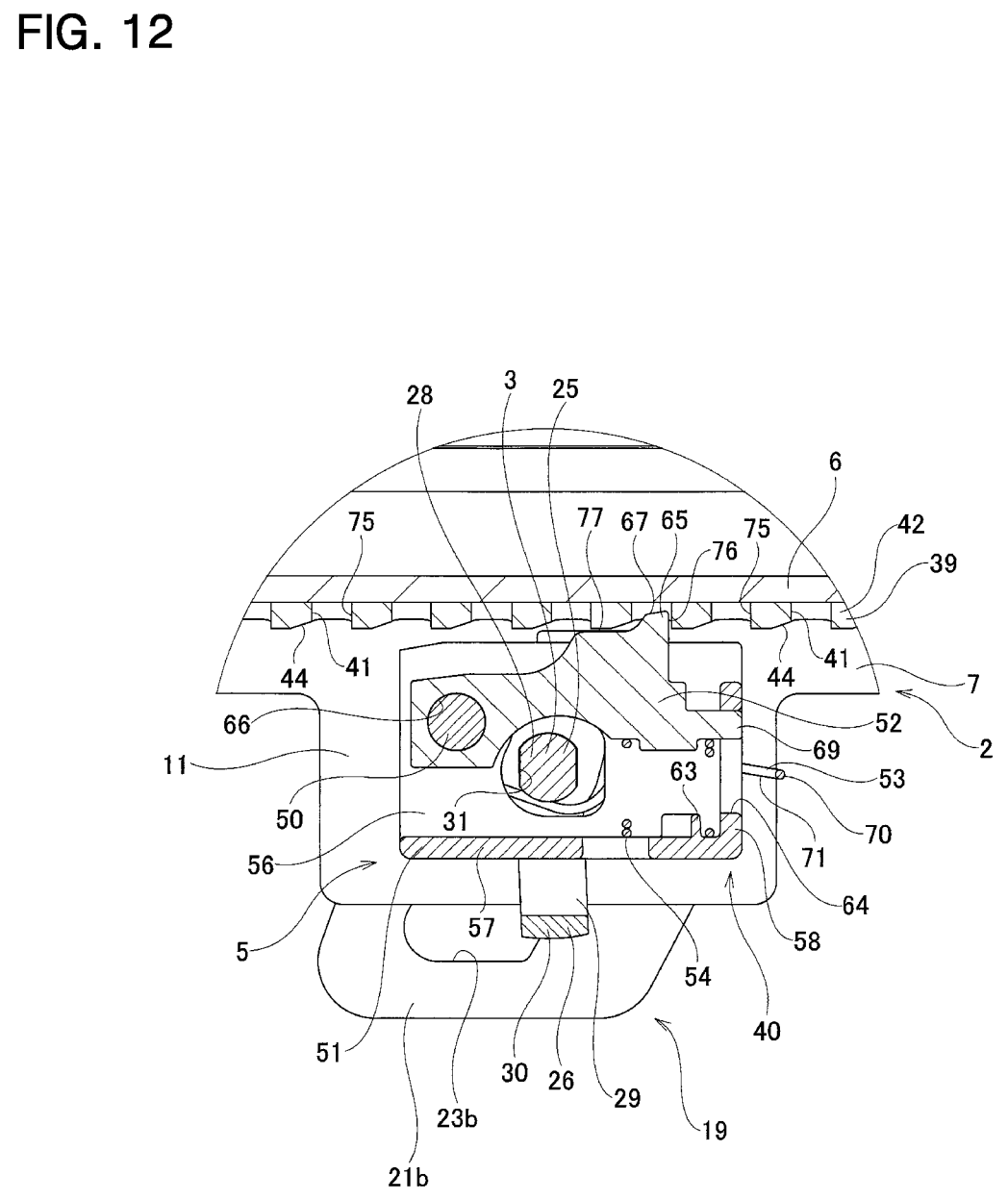
Figure 13:
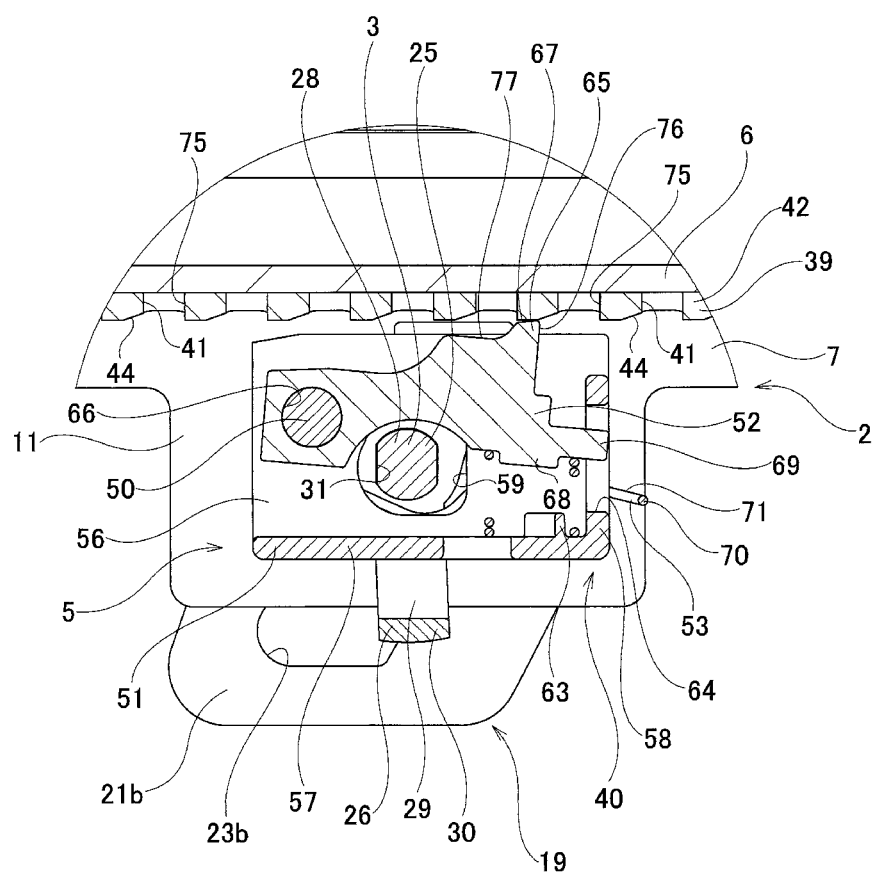
FIG. 13 is an enlarged view of section F in FIG. 6, and illustrates a semi-locked state.

When, in a state in which the positions in the axial direction of the protruding engagement portion 65 and the recessed engagement portion 41 are shifted, the adjustment lever 4 is operated to the normal position with the steering wheel held in the adjusted position, the locking mechanism 5 is set to the semi-locked state as illustrated in FIG. 13. In the semi-locked state, the tip-end surface of the protruding engagement portion 65 and the portion of the lower surface of the base plate portion 42 that is deviated in the axial direction from the recessed engagement portion 41 are in contact with each other, and the first element 51 is in the same position as the first element 51 in the locked state illustrated in FIG. 12.

In a state in which the locking mechanism 5 is in the semi-locked state, for example, when the inner column 6 is slightly displaced forward with respect to the outer column 7 due to an impact load associated with a secondary collision, and the position in the axial direction of the protruding engagement portion 65 matches the position in the axial direction of the recessed engagement portion 41, the tip-end portion of the second element 52 is elastically pressed upward due to the elasticity of the second biasing member 54, and the protruding engagement portion 65 engages with the recessed engagement portion 41. As a result, the locking mechanism 5 is set to a locked state as illustrated in FIG. 12. Therefore, even in a case where the locking mechanism 5 is in the semi-locked state, by the coupling member 47 shearing in the event that a secondary collision occurs, the steering wheel supported by the inner column 6 is allowed to displace forward through the inner column 6 and the upper shaft 16, and the impact load applied to the driver's body can be alleviated.

In the steering column device 1 of the present example, in a state in which the recessed engagement portion 41 and the protruding engagement portion 65 are engaged, even in a case where the recessed engagement portion 41 and the protruding engagement portion 65 are strongly engaged or stuck together due to a large axial force or the like being applied to the inner column 6, it is possible to prevent damage such as deformation to the locking mechanism 5 from occurring. In other words, in a state in which the recessed engagement portion 41 and the protruding engagement portion 65 are strongly engaged or stuck together, when the adjustment lever 4 is operated in a predetermined direction in order to adjust the position of the steering wheel, the cam member 26 of the adjustment rod 3 pivots from the state illustrated in FIG. 15 to the state illustrated in FIG. 16. On the other hand, the first element 51 of the outer side locking member 40 remains in the same position while causing the pair of extending arm portions 71 and the pair of locking arm portions 73 of the first biasing member 53 to elastically deform in a directions away from each other. Therefore, even in a state in which the recessed engagement portion 41 and the protruding engagement portion 65 are strongly engaged or stuck together, it is possible to prevent the force for operating the adjustment lever 4 from becoming excessively large, and it is possible to prevent damage such as deformation to the locking mechanism 5 due to large force being applied when the recessed engagement portion 41 and the protruding engagement portion 65 are disengaged.

Figure 16:
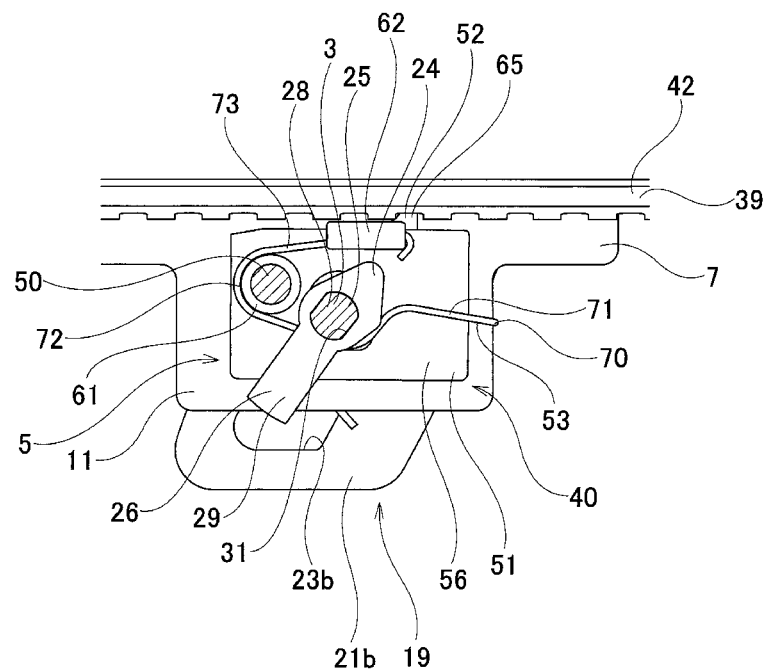
FIG. 16 is an enlarged view of section G in FIG. 7, and illustrates the unlocked state in which the protruding engagement portion and the recessed engagement portion are fixed.
Figure 17:
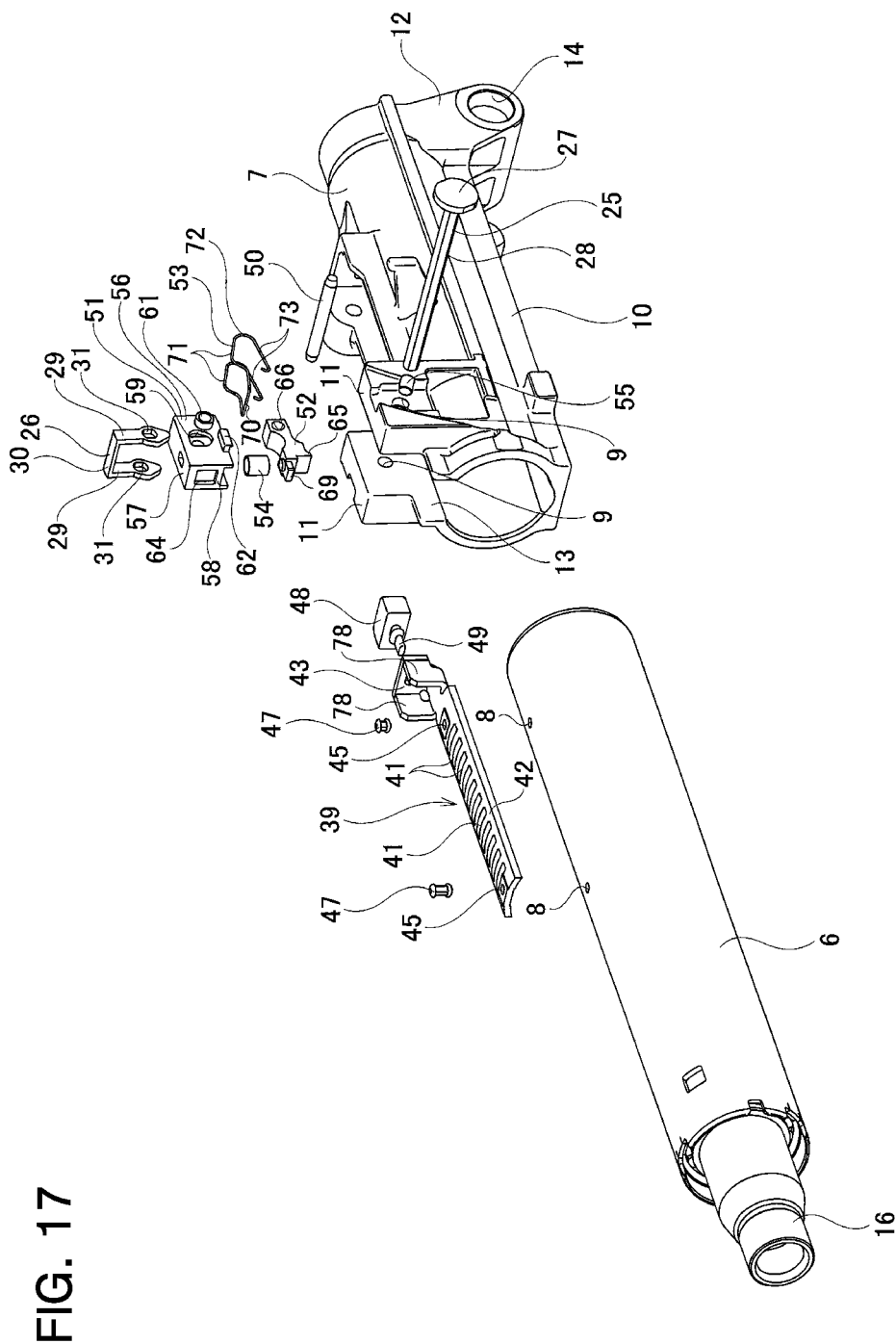
FIG. 17 is an exploded perspective view of the steering column device of the first example.
Figure 18:
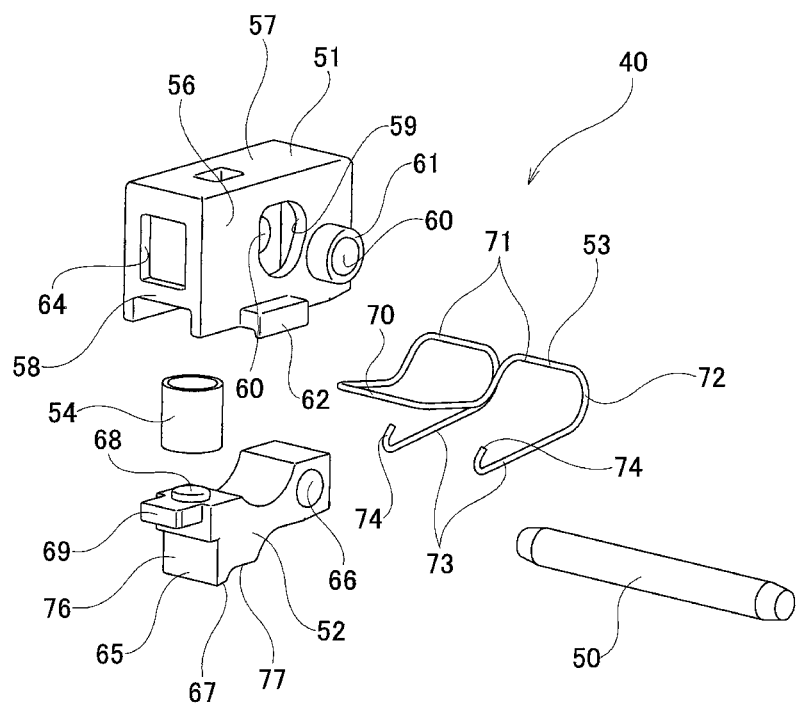
FIG. 18 is an exploded perspective view of an outer side locking member of the steering column device of the first example.
Figure 19:
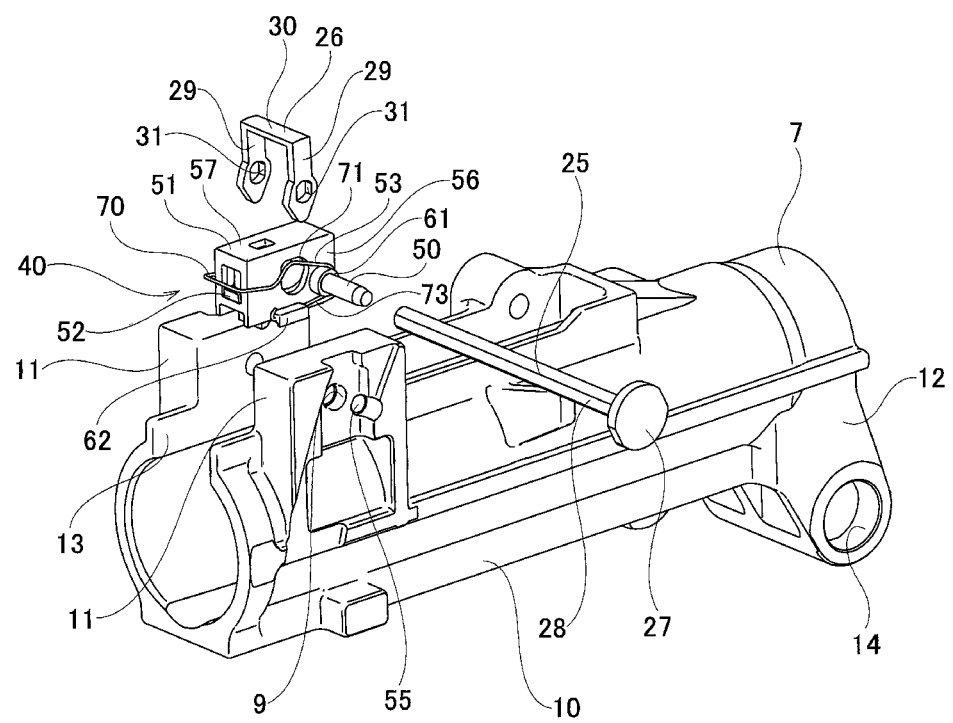
FIG. 19 is an exploded perspective view of an outer column, an adjustment rod, and an outer side locking member of the steering column device of the first example.

Even in a case where the recessed engagement portion 41 and the protruding engagement portion 65 are strongly engaged or stuck together, when the steering wheel is moved slightly toward the front or rear after operating the adjustment lever 4 in the predetermined direction, the locking pieces 62 are elastically pressed downward by the elastic restoring force of the first biasing member 53, and the first element 51 pivots in the clockwise direction in FIG. 16 about the pivot shaft 50, making it possible to release the engagement or fixation of the recessed engagement portion 41 and the protruding engagement portion 65. This allows the front-rear position of the steering wheel to be adjusted.

In the present example, the recessed engagement portion 41 has an inner guide surface portion 44 on the portion on the lower side of the front side surface that inclines downward as going toward the front, and the protruding engagement portion 65 has an outer guide surface portion 67 on the tip-end surface (upper side surface) that inclines downward as going toward the front. Therefore, in a case where the inner column 6 is slightly displaced forward with respect to the outer column 7 from a state in which the tip-end surface of the protruding engagement portion 65 and the portion of the lower surface of the base plate portion 42 that is deviated in the axial direction from the recessed engagement portion 41 are in contact with each other, the protruding engagement portion 65 can be guided inside the recessed engagement portion 41 by the inner guide surface portion 44 and the outer guide surface portion 67.

In the present example, by arranging the second biasing member 54 on the opposite side of the pivot shaft 50 across from the adjustment rod 3 in the axial direction, the distance between the pivot shaft 50, which is the center of pivoting of the second element 52 and the portion of the second element 52 that is pressed by the second biasing member 54 is increased. Therefore, the moment of force of the second element 52 about the pivot shaft 50 due to the elastic force of the second biasing member 54 can be increased, and it is possible to increase the force that elastically biases the protruding engagement portion 65 in the direction of engagement with the recessed engagement portion 41. Accordingly, even in a case where the locking mechanism 5 is in a semi-locked state and the inner column 6 is displaced forward at a high speed relative to the outer column 7 due to an impact load caused by a secondary collision, for example, the protruding engagement portion 65 can be engaged with the recessed engagement portion 41 at the instant when the inner column 6 is slightly displaced forward with respect to the outer column 7 and the position in the axial direction of the protruding engagement portion 65 matches the position in the axial direction of the recessed engagement portion 41.

In the present example, by arranging the pivot shaft 50, which is the portion that supports the first element 51 and the second element 52 with respect to the outer column 7, farther on the upper side than the column-side through hole 9, that is, farther on the upper side than the adjustment rod 3, the distance between the engagement portion between the protruding engagement portion 65 and the recessed engagement portion 41 and the pivot shaft 50 is shortened. Therefore, in a case where the inner column 6 is displaced forward with respect to the outer column 7, the direction of the force applied from the recessed engagement portion 41 to the protruding engagement portion 65 can be made substantially parallel to the central axis of the steering column 2. Accordingly, at the time of a secondary collision, the impact load applied to the inner column 6 can be efficiently transmitted from the recessed engagement portion 41 to the protruding engagement portion 65, and the coupling member 47 can be quickly sheared.

In the present example, the recessed engagement portion 41 has an inner side flat surface portion 75 perpendicular to the central axis of the inner column 6 on the rear side surface, and the protruding engagement portion 65 has an outer side flat surface portion 76 on the rear side surface that is substantially perpendicular to the central axis of the inner column 6 in a state in which the protruding engagement portion 65 and the recessed engagement portion 41 are engaged. Therefore, the impact load accompanying a secondary collision is applied from the recessed engagement portion 41 to the protruding engagement portion 65 through a contact portion between the flat surfaces of the inner side flat surface portion 75 and the outer side flat surface portion 76. That is, by increasing the area of the contact portion between the recessed engagement portion 41 and the protruding engagement portion 65 that transmits the impact load accompanying a secondary collision, the surface pressure at the contact portion can be kept small, and stress concentration can be prevented from occurring at the engagement portion between the protruding engagement portion 65 and the recessed engagement portion 41.

In the present example, the second element 52, at a portion of the upper side surface located on the front side of the protruding engagement portion 65, has a shoulder portion 77 that closely faces or comes in contact with a portion of the lower side surface of the base plate portion 42 of the inner side locking member 39 that is deviated in the axial direction from the recessed engagement portion 41 in a state in which the protruding engagement portion 65 and the recessed engagement portion 41 are engaged. Therefore, when the inner column 6 is about to displace forward with respect to the outer column 7 and the second element 52 is about to rotate in the counterclockwise direction in FIG. 12 about the pivot shaft 50 in a state in which the inner side flat surface portion 75 of the recessed engagement portion 41 and the outer side flat surface portion 76 of the protruding engagement portion 65 are in contact with each other, the shoulder portion 77 comes in contact with a portion of the lower side surface of the base plate portion 42 that is deviated in the axial direction from the recessed engagement portion 41. Thus, a part of the impact load caused by the secondary collision can be transmitted by the contact portion between the shoulder portion 77 and the portion of the lower side surface of the base plate portion 42 that is deviated in the axial direction from the recessed engagement portion 41. In other words, the surface pressure at the contact portion between the inner side flat surface portion 75 and the outer side flat surface portion 76 can be kept small, and stress concentration can be prevented from occurring at the engagement portion between the recessed engagement portion 41 and the protruding engagement portion 65.

In the present example, in a state in which the protruding engagement portion 65 is engaged with the recessed engagement portion 41, the upper side surface of the stopper piece 69 of the second element 52 comes in contact with the upper side surface (the surface facing downward) of the rectangular hole 64 of the first element 51, and the second element 52 is prevented from pivoting further upward relative to the first element 51. That is, the upper surface of the rectangular hole 64 of the first element 51 forms a stopper portion. Therefore, in a case where the first element 51 pivots in the clockwise direction in FIG. 14 and FIG. 15 about the pivot shaft 50 due to operation of the adjustment lever 4 in the predetermined direction, the upper side surface of the stopper piece 69 of the second element 52 can be pressed downward by the upper side surface of the rectangular hole 64 which is the stopper portion. Therefore, based on the operation of the adjustment lever 4 in the predetermined direction, the engagement between the recessed engagement portion 41 and the protruding engagement portion 65 can be reliably disengaged.

In the present example, an example has been described in which the content according to the present disclosure is applied to a steering column device that includes both a telescopic mechanism for adjusting the front-rear position of the steering wheel and a tilt mechanism for adjusting the up-down position; however, the content according to the present disclosure may also be applied to a steering column device that includes only a telescopic mechanism.

The steering column device 1 of the present example includes a steering column 2 configured by combining an inner column 6 on the rear side and an outer column 7 on the front side so as to expand and contract; however, the content according to the present disclosure may also be applied to a steering column device including a steering column formed by combining an inner column on the front side and an outer column on the rear side. In this case, the column-side through hole is configured by a long hole extending in the front-rear direction.

In the present example, the locking mechanism 5 is arranged on the lower side of the steering column 2; however, in a case of implementing the steering column device according to the present disclosure, the circumferential position of the locking mechanism is not particularly limited, and for example, may be arranged on the upper side of the steering column.

In a case of implementing the steering column device according to the present disclosure, the outer side locking member may include a plurality of protruding engagement portions. More specifically, for example, configuration may be such that the locking mechanism is switched to the locked state by engaging a rack-shaped inner tooth portion provided on the inner side locking member and a rack-shaped outer tooth portion provided on the outer side locking member. In this case, among a plurality of claws forming the inner tooth portion, recessed portions existing between adjacent claws form the recessed engagement portions, and the claws of the outer tooth portion form the protruding engagement portions.

Second Example

A second example of an embodiment according to the present disclosure will be described using FIG. 21. In the present example, in a state in which the protruding engagement portion 65 is engaged with the recessed engagement portion 41, the first element 51a does not have a stopper portion that prevents the second element 52a from being further displaced with respect to the first element 51a in the biasing direction by the second biasing member 54a. More specifically, the first element 51a does not have the end plate portion 58 and the rectangular hole 64 that the first element 51 has in the first example.

In the present example, of the second biasing member 54a, a lower end portion is supported by and fixed to the spring locking portion 63a of the first element 51a by crimping or the like, and an upper end portion is supported by and fixed to a spring locking portion 68a of the second element 52a by crimping or the like.

Figure 21:
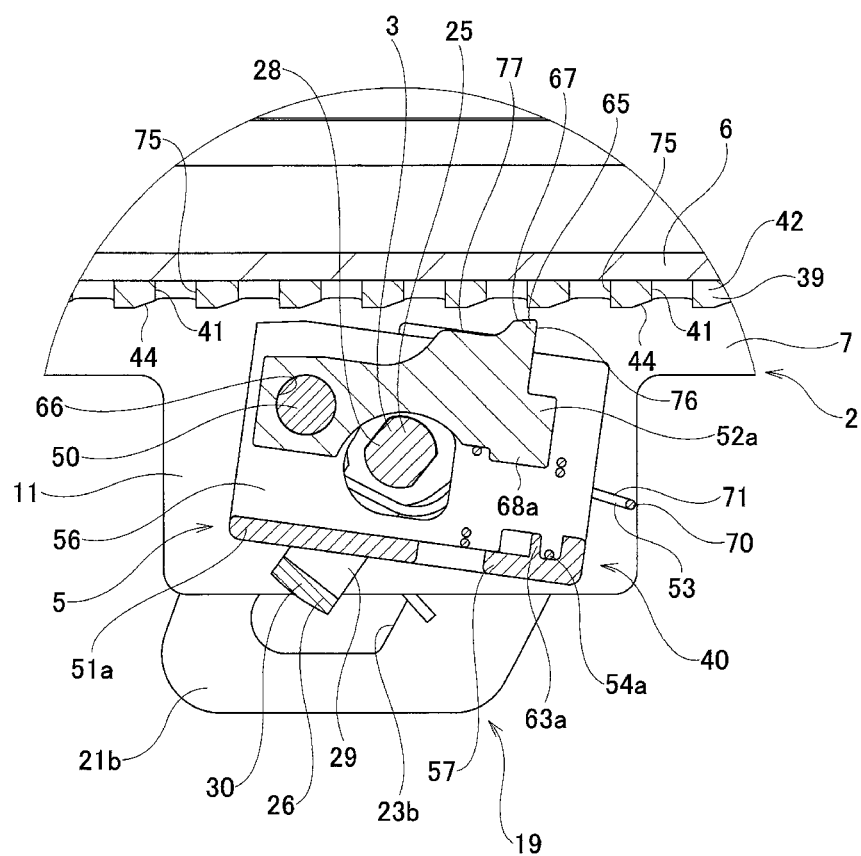
FIG. 21 is a view corresponding to FIG. 11 of a steering column device of a second example of an embodiment according to the present disclosure.
Figure 22:
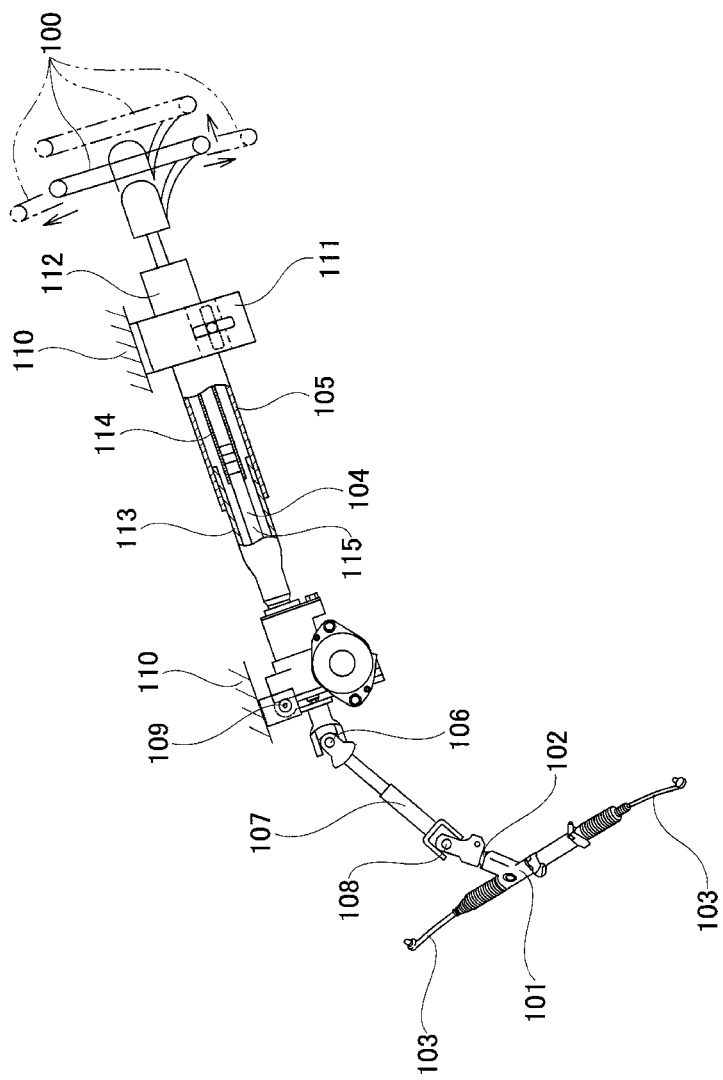
FIG. 22 is a partial cutaway side view illustrating an example of a conventional steering device.

In the present example, in a case where the first element 51a pivots in a clockwise direction in FIG. 21 about the pivot shaft 50 due to operation of the adjustment lever 4 (see FIG. 1 to FIG. 5) in a predetermined direction, in order to make it possible to adjust the position of the steering wheel, the spring locking portion 68a of the second element 52a is pulled downward through the second biasing member 54a. As a result, the second element 52a is pivoted in a clockwise direction in FIG. 21 about the pivot shaft 50, and the protruding engagement portion 65 and the recessed engagement portion 41 are disengaged. Therefore, the spring characteristics such as the spring constant and free length of the second biasing member 54a, which is a compression coil spring, are regulated, and in a state in which the adjustment lever 4 is operated a certain amount in the predetermined direction, the protruding engagement portion 65 and the recessed engagement portion 41 are disengaged. The other configurations and effects of the second example are the same as those of the first example.

REFERENCE SIGNS LIST

1 Steering column device
2 Steering column
3 Adjustment rod
4 Adjustment lever
5 Locking mechanism
6 Inner column
7 Outer column
8 Coupling hole
9 Column-side through hole
10 Column main body
11 Held portion
12 Front support bracket
13 Slit
14 Pivot
15 Steering shaft
16 Upper shaft
17 Lower shaft
18a, 18b Radial rolling bearing
19 Vehicle body side bracket
20 Mounting plate portion
21a, 21b Support plate portion
22 Mounting hole
23a, 23b Elongated tilt hole
24 Cam portion
25 Rod main body
26 Cam member
27 Head portion
28 Shaft portion
29 Arm portion
30 Connecting portion
31 Fitting hole
32 Nut
33 Thrust bearing
34 Washer
35a, 35b Pressing portion
36 Expansion/contraction mechanism
37 Driven cam
38 Driving cam
39 Inner side locking member
40 Outer side locking member
41 Recessed engagement portion
42 Base plate portion
43 Bent plate portion
44 Inner guide surface portion
45 Coupling hole
46 Through hole
47 Coupling member
48 Damper
49 Pin portion
50 Pivot shaft
51, 51a First element
52, 52a Second element
53 First biasing member
54, 54a Second biasing member
55 Support hole
56 Side plate portion
57 Connecting plate portion
58 End plate portion
59 Through hole
60 Support hole
61 Cylindrical portion
62 Locking piece
63, 63a Spring locking portion
64 Rectangular hole
65 Protruding engagement portion
66 Support hole
67 Outer guide surface portion
68, 68a Spring locking portion
69 Stopper piece
70 Base portion
71 Extending arm portion
72 Folded portion
73 Locking arm portion
74 Bent portion
75 Inner side flat surface portion
76 Outer side flat surface portion
77 Shoulder portion
78 Lateral bent portion
100 Steering wheel
101 Steering gear unit
102 Input shaft
103 Tie rod
104 Steering shaft
105 Steering column
106 Universal joint
107 Intermediate shaft
108 Universal joint
109 Pivot shaft
110 Vehicle body 111 Fixed bracket
112 Outer column
113 Inner column
114 Outer tube
115 Inner shaft

The invention claimed is:

1. A steering column device comprising:
a steering column including an inner column, and an outer column having a column-side through hole penetrating in a width direction, arranged on one side in an axial direction of the inner column, and externally fitted so as to displace relative to the inner column in the axial direction;
an adjustment rod having a cam portion on an outer circumferential surface and inserted into the column-side through hole;
an adjustment lever fixed to the adjustment rod and configured to rotate the adjustment rod; and
a locking mechanism including an inner side locking member having a recessed engagement portion at a plurality of locations in the axial direction and provided on the inner column, and an outer side locking member having a protruding engagement portion capable of engaging with the recessed engagement portion; wherein
the outer side locking member has a first element, at least a portion of which is supported movably toward and away from the inner side locking member; a second element having the protruding engagement portion and supported such that the protruding engagement portion is able to displace in an engagement-disengagement direction with respect to the recessed engagement portion; a first biasing member elastically biasing at least a portion of the first element in a direction away from the inner side locking member; and a second biasing member elastically biasing the second element in a direction such that the protruding engagement portion is engaged with the recessed engagement portion with respect to the engagement-disengagement direction; and
the cam portion presses the first element in a direction such that at least a portion of the first element approaches the inner side locking member due to rotation of the adjustment rod in response to operation of the adjustment lever.

2. The steering column device according to claim 1, wherein
the first element has a stopper portion that, in a state in which the protruding engagement portion is engaged with the recessed engagement portion, is configured to prevent the second element from being displaced with respect to the first element in a biasing direction by the second biasing member.

3. The steering column device according to claim 1, wherein
the outer side locking member has a pivot shaft that is arranged in the width direction and is supported with respect to the outer column so that relative displacement in the axial direction and radial direction of the steering column is not possible; and
the first element is supported so as to pivot about the pivot shaft.

4. The steering column device according to claim 3, wherein
the second element is supported so as to pivot about the pivot shaft.

5. The steering column device according to claim 4, wherein
the pivot shaft is arranged at a position closer to the inner side locking member than the adjustment rod with respect to the radial direction of the steering column.

6. The steering column device according to claim 4, wherein
the second biasing member is arranged on an opposite side of the pivot shaft with the adjustment rod therebetween with respect to the axial direction of the steering column.

7. The steering column device according to claim 6, wherein
the second biasing member is configured by a compression coil spring.

8. The steering column device according to claim 1, further comprising
a coupling member configured to support the inner side locking member with respect to the inner column so as to detach due to an impact load accompanying a secondary collision.

9. The steering column device according to claim 1, further comprising
a guide surface portion that is inclined toward the one side in the axial direction as going outward in the radial direction on at least one of a surface of the one side in the axial direction of the recessed engagement portion and a tip-end surface of the protruding engagement portion.

10. The steering column device according to claim 1, wherein
the second element, has a shoulder portion at a portion located on the one side in the axial direction of the protruding engagement portion, the shoulder portion closely facing or coming in contact with a portion of the inner side locking member that is deviated in the axial direction from the recessed engagement portion in a state in which the protruding engagement portion is engaged with the recessed engagement portion.

* * * * *